United States Patent
Subramanyam et al.

(10) Patent No.: US 9,495,296 B2
(45) Date of Patent: Nov. 15, 2016

(54) HANDLING MEMORY PRESSURE IN AN IN-DATABASE SHARDED QUEUE

(71) Applicant: Oracle International Corporation, Redwood Shores, CA (US)

(72) Inventors: Sunitha Subramanyam, Redwood City, CA (US); Shubha Bose, Karnataka (IN); Anil Madan, San Ramon, CA (US); Devendra Singh, Karnatka (IN); James W. Stamos, Saratoga, CA (US); Mukesh Jaiswal, Karnatka (IN)

(73) Assignee: Oracle International Corporation, Redwood Shores, CA (US)

( * ) Notice: Subject to any disclaimer, the term of this patent is extended or adjusted under 35 U.S.C. 154(b) by 87 days.

(21) Appl. No.: 14/165,974

(22) Filed: Jan. 28, 2014

(65) Prior Publication Data

US 2014/0372702 A1   Dec. 18, 2014

Related U.S. Application Data

(63) Continuation-in-part of application No. 14/095,734, filed on Dec. 3, 2013, which is a continuation-in-part of application No. 14/095,543, filed on Dec. 3, 2013.

(60) Provisional application No. 61/834,246, filed on Jun. 12, 2013.

(51) Int. Cl.
G06F 17/30 (2006.01)
G06F 12/08 (2016.01)

(52) U.S. Cl.
CPC ....... *G06F 12/0848* (2013.01); *G06F 12/0868* (2013.01); *G06F 17/30067* (2013.01); *G06F 2212/465* (2013.01)

(58) Field of Classification Search
CPC .................................................. G06F 17/30067
USPC ......................................................... 707/812
See application file for complete search history.

(56) References Cited

U.S. PATENT DOCUMENTS

| 8,489,820 B1 | 7/2013 | Ellard |
| 2002/0186656 A1 | 12/2002 | Vu |
| 2006/0218560 A1 | 9/2006 | Dadiomov et al. |

(Continued)

OTHER PUBLICATIONS

Kejser, Thomas, "Table Pattern: Database Message Queues", dated May 25, 2012, 10 pages.

(Continued)

*Primary Examiner* — Joshua Bullock
(74) *Attorney, Agent, or Firm* — Hickman Palermo Becker Bingham LLP

(57) ABSTRACT

Handling memory pressure in an in-database sharded queue is described. Messages from a plurality of enqueuers are stored in a plurality of shards of a sharded queue. Messages from a first enqueuer are stored in a first shard. A queue table corresponding to the sharded queue is maintained. In volatile memory, a plurality of message caches is maintained, each message cache corresponding to a shard of the plurality of shards. Memory pressure is detected based on memory usage of the volatile memory. To store a specific message from the enqueuer, the specific message is stored in rows of the queue table that are assigned to the first shard. When memory pressure is not detected, the specific message is stored in a first message cache corresponding to the first shard. Subscribers of the sharded queue are caused to dequeue messages from the plurality of shards.

20 Claims, 13 Drawing Sheets

(56) References Cited

U.S. PATENT DOCUMENTS

| | | |
|---|---|---|
| 2007/0101341 A1 | 5/2007 | Downing |
| 2009/0133023 A1* | 5/2009 | Li .......................... G06F 9/546 718/102 |
| 2010/0198920 A1 | 8/2010 | Wong |
| 2010/0281491 A1 | 11/2010 | Surlaker |
| 2011/0099233 A1* | 4/2011 | Calder ................... G06F 9/546 709/206 |
| 2011/0202929 A1 | 8/2011 | Schleimer |
| 2014/0040040 A1 | 2/2014 | Townsend |
| 2014/0067940 A1 | 3/2014 | Li |
| 2014/0372486 A1 | 12/2014 | Bose et al. |
| 2014/0372489 A1 | 12/2014 | Jaiswal et al. |

OTHER PUBLICATIONS

U.S. Appl. No. 14/095,734, filed Dec. 3, 2013, Office Action, Oct. 21, 2015.
U.S. Appl. No. 14/095,734, filed Dec. 3, 2013, Interview Summary, Apr. 19, 2016.
U.S. Appl. No. 14/095,543, filed Dec. 3, 2013, Final Office Action, Apr. 20, 2016.
U.S. Appl. No. 14/095,543, filed Dec. 3, 2013, Office Action, Jan. 4, 2016.

* cited by examiner

| M1 Tx1 | M2 Tx2 | M3 Tx1 | M4 Tx1 | M5 Tx2 | Tx1 Cmt | M6 Tx2 | Tx2 Cmt | 910 |

T0　T1　T2　T3　T4　T5　T6　T7
→ Time

FIG. 9A

| M1 UC | M2 UC | M3 UC | M4 UC | M5 UC | 920 |

→ Time

FIG. 9B

| M1 C | M2 UC | M3 C | M4 C | M5 UC | 920 |

→ Time

FIG. 9C

| M1 C | M2 C | M3 C | M4 C | M5 C | M6 C | 920 |

→ Time

FIG. 9D

HANDLING MEMORY PRESSURE IN AN IN-DATABASE SHARDED QUEUE

CROSS-REFERENCE TO RELATED APPLICATIONS; BENEFIT CLAIM

This application claims the benefit of Provisional Appln. 61/834,246 filed Jun. 12, 2013, entitled "An In-Database Sharded Queue That Supports JMS Session Ordering", the entire contents of which is hereby incorporated by reference as if fully set forth herein, under 35 U.S.C. §119(e). This application also claims the benefit as a Continuation-in-part of application Ser. No. 14/095,734, filed Dec. 3, 2013, entitled "An In-Database Sharded Queue for a Shared Disk Database," which claims the benefit as a Continuation-in-part of application Ser. No. 14/095,543, filed Dec. 3, 2013, entitled "An In-Database Sharded Queue," which claims the benefit of Provisional Appln. 61/834,246, filed Jun. 12, 2013, entitled "An In-Database Sharded Queue That Supports JMS Session Ordering," the entire contents of each of which are hereby incorporated by reference as if fully set forth herein.

FIELD OF THE INVENTION

The present invention relates to queues and, more specifically, to sharded queues implemented in a database system.

BACKGROUND

In many applications, it is necessary for one process (computer program, module, or thread) executing on a computer system to communicate with one or more other processes executing on the same or other computer systems. The mechanism used to carry out these communications varies from system to system.

One mechanism that has facilitated process-to-process communication in a variety of systems is a "message queue". As illustrated in FIG. 1, to use a conventional message queue, processes ("enqueue sessions") send information to other processes ("dequeue sessions") by placing messages in a message queue 100. The dequeue sessions obtain the information from the enqueue sessions by reading the messages from the message queue 100. When all dequeue sessions that need to read a given message from the message queue 100 have read the given message, the message is removed from the message queue 100. Implementations of message queues are described in U.S. Pat. No. 7,181,482, U.S. Pat. No. 7,185,033, U.S. Pat. No. 7,185,034, U.S. Pat. No. 7,203,706, U.S. Pat. No. 7,779,418, U.S. Pat. No. 7,818,386, U.S. Pat. No. 7,680,793, U.S. Pat. No. 6,058,389, and U.S. Pat. No. 8,397,244, the contents of all of which are incorporated herein by reference.

Unfortunately, conventional implementations of message queues do not scale well. Specifically, as the number of dequeue sessions increases, the contention for the "hot" messages at the head of the queue increases, thereby degrading performance. In addition, when the enqueue sessions and dequeue sessions are spread across several systems, the amount of communication on the interconnect between the systems can become excessive. Furthermore, queue performance may be adversely affected by low memory situations in both single-instance databases and shared-disk databases. Low memory situations may result, for example, when the rate of enqueuing into a queue is faster than the rate of dequeuing from the queue. In such situations, the ever-increasing number of queued messages consumes increasingly large amounts of memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 9A-D are block diagrams illustrating full replay protocol, according to an embodiment.

DETAILED DESCRIPTION

Figure 1:
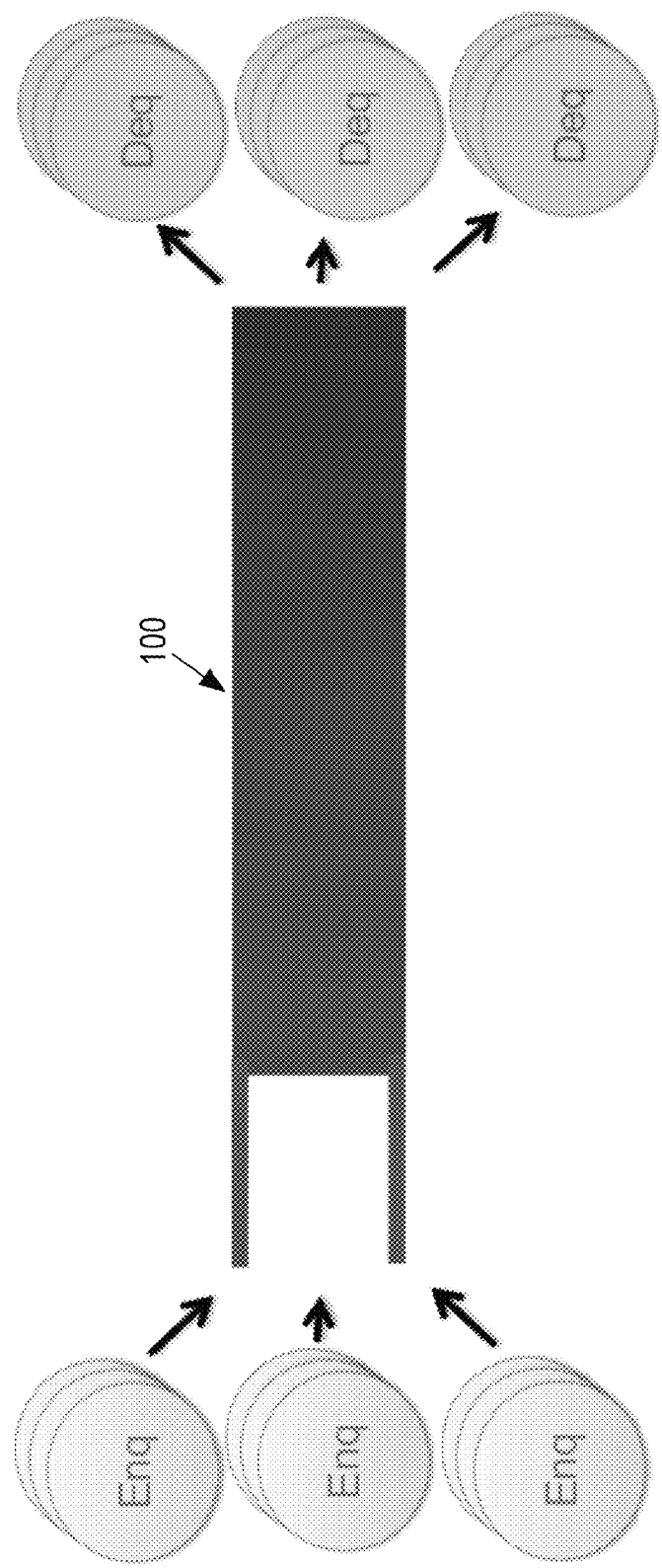
FIG. 1 is a block diagram of a conventional message queue.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for detecting and handling low memory situations when using "sharded queues" to communicate messages. Similar to conventional queuing systems, enqueue sessions add messages to a sharded queue, and dequeue sessions consume messages from the sharded queue. However, a single sharded queue is implemented by a plurality of shards, and a message may be placed in the single sharded queue by placing the message in any one of the shards that implement that single sharded queue. A sharded queue may be implemented in a single instance database or a shared-disk database.

Each shard of a sharded queue may be divided into one or more ordered subshards. Within a subshard, messages are ordered by enqueue-time. A subshard may be implemented on disk using a queue table, and/or in volatile memory using a message cache. For example, persistent messages enqueued in a specific subshard may be stored in a specific partition of a queue table that is associated with the specific subshard.

Messages enqueued in queue shards may be cached, i.e., stored in a message cache in volatile memory. In one embodiment, the messages for a queue shard are stored in a corresponding message cache that has multiple buffers, where each buffer is associated with a subshard of the corresponding queue shard. Messages enqueued in a specific queue shard may also be "uncached". An uncached message is stored persistently in the queue table (i.e. on disk) but not in the message cache (i.e. in volatile memory). In one embodiment, an uncached message is enqueued into an uncached subshard, which stores the uncached message in the queue table but does not store the message in the message cache, although subshard metadata may be stored in the message cache.

A cached message is stored persistently in the queue table and in the message cache. In one embodiment, a cached message is enqueued into a cached subshard, which stores the cached message in the queue table and the message cache. A shard may contain both cached subshards and uncached subshards.

According to one embodiment, when a subshard needs to be created to store additional messages for a shard, an uncached subshard is created when a low memory situation is detected. When a queue shard is uncached due to a low memory situation, only metadata is stored in the message cache. Such a subshard does not store a message in the message cache when the message is enqueued. When a subshard is uncached, additional indexing information is maintained on disk.

A subscriber to a sharded queue may have one or more dequeue sessions. Subscribers that consume messages from a particular sharded queue must dequeue messages from all shards of that particular sharded queue. For environments with a single database instance, a subscriber may have a single dequeue session that dequeues messages from all shards.

For shared-disk database environments where multiple database instances are sharing the same persistent storage, a subscriber may have multiple dequeue sessions, each of which dequeues only from the shards that have affinity to the instance containing the dequeue session. Dequeue sessions that dequeue from shards enqueued on different instances may be implemented over an interconnect configured to support communication between different database instances of the shared-disk database. In a shared-disk database environment, how low memory situations are handled may depend on whether low memory is detected in the node on which the enqueuing session is running (the "enqueuing instance") and/or the node on which the dequeuing session is running (the "dequeuing instance").

Messages

A message is data to be communicated via a queue. In one embodiment, a message includes a set of metadata and a payload. Each message is uniquely identified by a corresponding message identifier. The payload of a message is the data in the message. In one embodiment, each payload has associated metadata that is stored outside the payload in a message handle. Payloads can be of different sizes. As shall be explained in greater detail hereafter, the size of a payload may be a factor in determining whether the payload is stored in-line, out-of-line or only in a database table (not cached) and the available memory may determine whether the message is cached at all.

Sharded Queues

Figure 2:
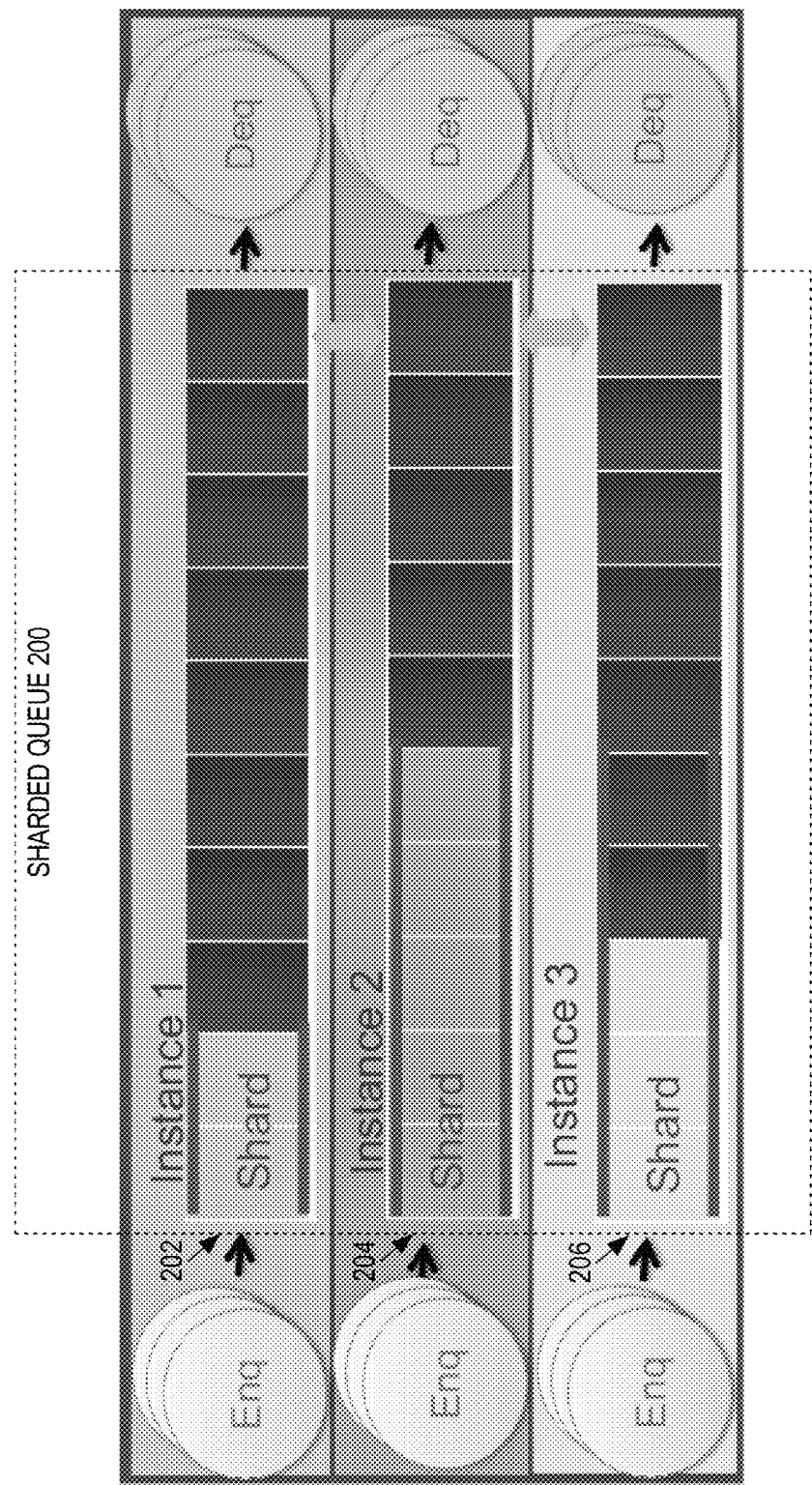
FIG. 2 is a block diagram of a sharded queue, according to an embodiment.

FIG. 2 is a block diagram of a sharded queue 200, according to an embodiment. Referring to FIG. 2, sharded queue 200 is composed of multiple shards 202, 204 and 206. While in the illustrated embodiment, sharded queue 200 has three shards, the actual number of shards used to implement a sharded queue may vary from implementation to implementation. For example, in one embodiment, the number of shards for a sharded queue can be specified by an administrator. In an alternative embodiment, lower and upper bounds may be specified, and the system can dynamically vary the number of shards available for enqueue.

In the illustrated embodiment, the shards that belong to queue 200 are maintained separate from each other, and may be managed by different database server instances. In the example illustrated in FIG. 2, shards 202, 204 and 206 are respectively maintained by distinct instances 1, 2 and 3 of a database server. While the illustrated embodiment shows one shard in each database server instance, there is no limit to the number of shards, of a given sharded queue, that any database server instance may have.

Shards 202, 204 and 206 store distinct sets of messages for the same sharded queue 200. In the embodiment illustrated in FIG. 2, shard 202 stores messages, of sharded queue 200, that are enqueued by enqueue sessions that are executing in instance 1. Similarly, shard 204 stores messages, of sharded queue 200, that are enqueued by enqueue sessions that are executing in instance 2, and shard 204 stores messages, of sharded queue 200, that are enqueued by enqueue sessions that are executing in instance 3. In one embodiment, an enqueue session that enqueues to a sharded queue always enqueues to the same shard of the sharded queue, hereafter referred to as "enqueue affinity."

In the example illustrated in FIG. 2, shards 202, 204 and 206 are maintained by distinct instances. Alternatively, one or more shards of a sharded queue may be maintained by the same instance. In one embodiment, a sharded queue may be implemented in a single instance database, and all shards of the sharded queue are maintained by the single instance. Multiple shards on a single instance may help minimize contention, such as among parallel enqueue sessions.

A sharded queue, such as sharded queue 200, may be implemented on disk and/or in memory. An on-disk implementation may be stored in a database or in any other persistent storage. An in-memory implementation may be stored in RAM or any other volatile memory. In a shared-disk database, an in-memory implementation may be stored in shared memory accessible to all processes belonging to a single instance, such as the System Global Area (SGA) of a database instance. In embodiments that shall be described in greater detail hereafter, a sharded queue may be implemented on disk using a queue table, and/or in memory using a message cache.

Subshards

Each shard may be divided into one or more ordered subshards. Within a subshard, messages are ordered by enqueue-time. In one embodiment, enqueue affinity is maintained such that an enqueuer always enqueues to the same shard of the sharded queue, such that a dequeue session can access the messages of each enqueuer in chronological order. In embodiments that shall be described in greater detail hereafter, a subshard may be implemented on disk within a queue table, and/or in memory within a message cache.

The Queue Table

Figure 3:
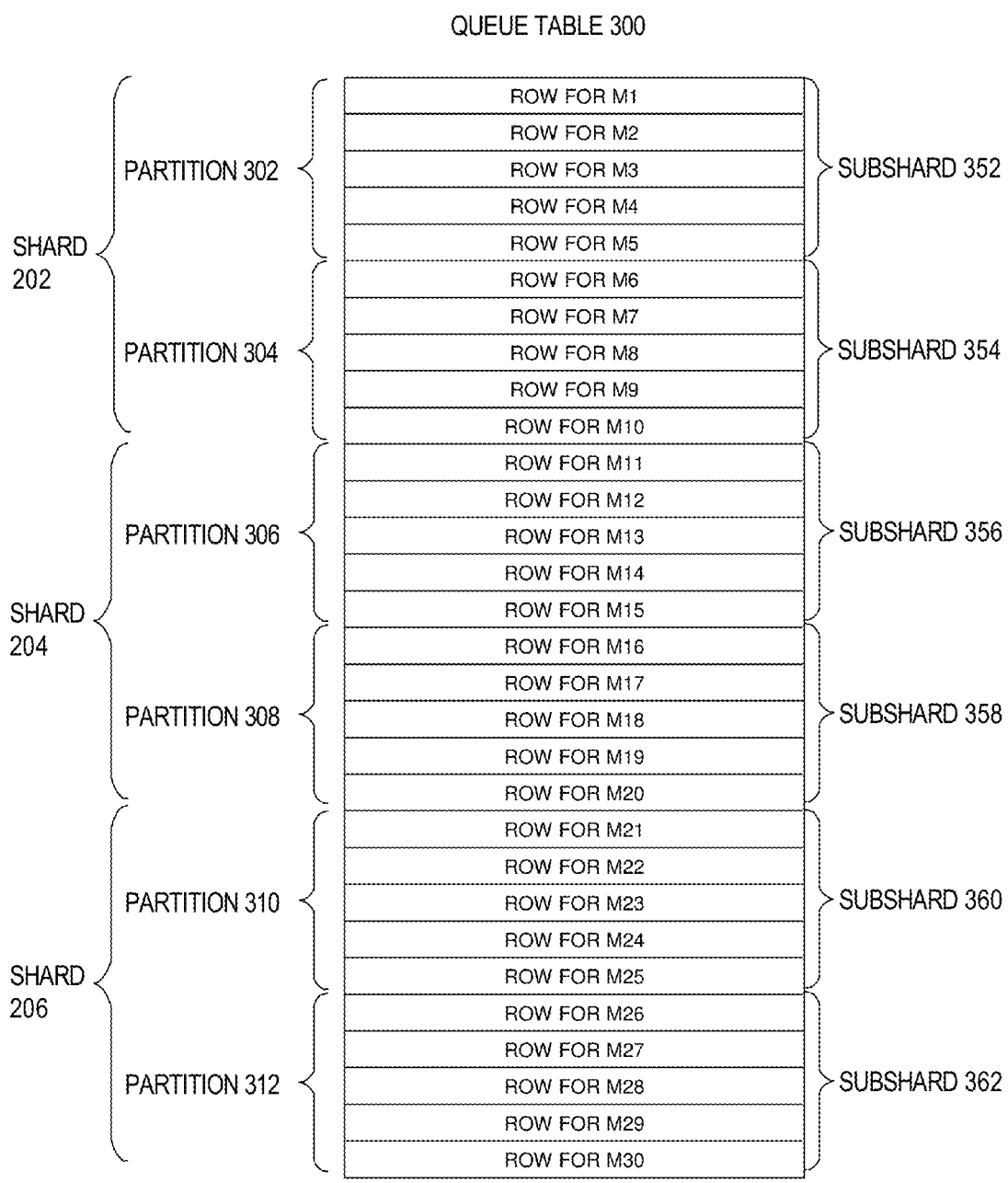
FIG. 3 is a block diagram illustrating how a sharded queue may be implemented using a partitioned queue table, according to one embodiment.

According to one embodiment, sharded queue 200 is implemented on disk using a partitioned queue table 300, as illustrated in FIG. 3. Referring to FIG. 3, queue table 300 is divided into six partitions 302, 304, 306, 308, 310 and 312. Each shard of queue 200 is currently assigned two of the partitions of queue table 300. Specifically, shard 202 is assigned partitions 302 and 304, shard 204 is assigned partitions 306 and 308, and shard 206 is assigned partitions 310 and 312.

While, for the purpose of illustration, each shard of sharded queue 200 has two partitions of queue table 300, the number of partitions used by each shard may vary based on a variety of factors, including the rate at which enqueuers are enqueuing messages to each shard, and the rate at which dequeuers are dequeuing messages from each shard. Thus, the number of partitions in any given shard may vary over time, with new partitions being added when enqueuers run out of storage for new messages, and partitions being recycled or dropped as dequeuers finish dequeuing all messages in a partition.

In the illustrated embodiment, each partition has five rows of the queue table 300. However, in typical implementations, the number of rows in each partition may vary. For example, some partitions may have tens of thousands of rows.

Because queue 200 is implemented using a partitioned table, enqueuing a persistent message involves inserting a row into a partition of queue table 300. For example, an enqueue session with affinity to shard 202 would enqueue a message in queue table 300 by inserting a row that corresponds to the message into a partition associated with shard 202, such as partition 302 or partition 304 of queue table 300. In one embodiment, shard 202 is configured to maintain a current insertion point such that messages are inserted into one of the associated partitions 302-304 based on the current insertion point of shard 202.

In an embodiment that shall be described in greater detail hereafter, the operations performed on queue table 300 include SQL INSERTs (to enqueue messages), SQL SELECTs (for dequeuing messages with large message payloads), and partition-level SQL TRUNCATEs (in the background to discard messages that are no longer needed).

Queue Table Partitions

As mentioned above, queue table 300 is partitioned. At any given time, a queue table partition is either assigned to a specific shard, or is in a "free pool" of queue table partitions maintained for the sharded queue. When a queue table partition has been processed by all relevant subscribers, the queue table partition is added to the free pool. When additional storage is needed for a specific shard, then a queue table partition is removed from the free pool and assigned to the shard. When reused in this manner, the same queue table partition may be assigned to different shards, of the same sharded queue, at different points in time.

If additional storage is needed for a specific shard and the free pool is empty, then a new queue table partition is created and assigned to the shard.

Queue Table Subshard Implementation

When a shard is implemented on disk using a queue table, a subshard is a subset of the queue table rows that have been assigned to a shard. In one embodiment, each subshard of a given shard is assigned one or more queue table partitions that have been assigned to the given shard. In another embodiment, a single queue table partition can be assigned to multiple subshards. In alternative embodiments, the shards are divided into subshards irrespective of the partitioning of queue table 300.

When the partitions of the queue table are used to establish subshards, the number of queue table partitions assigned to any given subshard may vary. For example, a shard may have one subshard with three queue table partitions, and another subshard with five queue table partitions.

For the convenience of explanation, it shall be assumed that subshards include a single partition of the queue table. Under this assumption, each of shards 202, 204 and 206 has two subshards. The mapping between shards, queue table partitions, and subshards is illustrated in FIG. 3.

Specifically, the partitions 302 and 304 that belong to shard 202 correspond to subshards 352 and 354. The partitions 306 and 308 that belong to shard 204 correspond to subshards 356 and 358. The partitions 310 and 312 that belong to shard 206 correspond to subshards 360 and 362.

Queue Table Rows

Each row in the queue table corresponds to a persistent message that has been enqueued in the sharded queue associated with the queue table. In the embodiment illustrated in FIG. 3, partition 302 has one row for each of messages M1 to M5, partition 304 has one row for each of messages M6 to M10, partition 306 has one row for each of messages M11 to M15, partition 308 has one row for each of messages M16 to M20, partition 310 has one row for each of messages M21 to M25, and partition 312 has one row for each of messages M26 to M30.

According to one embodiment, within queue table 300, the row for a given message includes the following information for the message:
MSGID—Message identifier
SEQ_NUM—Sequence number from message id
CORRELATION—Correlation id
ENQUEUE_TIME—Enqueue time of the message
PRIORITY—Priority value of the message
EXPIRATION—Expiration time of the message
STATE—Message state
SUBSCRIBER_MAP—Subscriber bitmap (NULL for a single consumer queue)
USER_PROPERTIES_TEXT—JMS user properties in text (e.g. when the property size is less than or equal to a property size threshold, such as 4000 bytes.)
USER_PROPERTIES_CLOB—JMS user properties in LOB (e.g. when the property size is greater than the property size threshold)
USERDATA_RAW—Message payload (e.g. when size is less than or equal to a payload size threshold, such as 2000 bytes)
USERDATA_BLOB—Message payload (e.g. when size is greater than the payload size threshold)

When a shard is implemented for Java Message Service (JMS) messages, each corresponding queue table row may also have the following information:
JMS_MSG_TYPE—Indicates JMS message type (e.g. text, bytes, stream, map, etc.)
HEADER_PROPERTIES—JMS header properties

The Message Identifier

In one embodiment, the message identifier of each message is unique relative to all other messages in the sharded queue. Similar to a ROWID of a database table row, the message id is used for navigation within the queue.

For example, in one embodiment, the message identifier may have the following fields:
subshard id
shard id
priority
endian
sequence Subshard id represents the unique number associated with a subshard within a shard. Shard id represents the unique number associated with the shard in which the message is placed.

Priority represents the priority values associated with the message. The field endian represents the endian of the platform on which the database is installed. This field is used to ensure correct representation of message-id in-memory as well as in queue tables. The sequence field identifies a message within the subshard.

Selection Conditions

A queue that has multiple subscribers is referred to as a multi-consumer queue. Every subscriber to a multi-consumer queue is not necessarily interested in all messages that are enqueued in the queue. Thus, each subscriber may have a rule that indicates selection conditions. During the dequeuing operation, the messages that satisfy the selection conditions of the subscriber are to be consumed by the subscriber, and messages that do not satisfy the selection conditions of the subscriber are to be skipped by the subscriber. In one embodiment:
"rule condition" refers to a combination of Boolean SQL expressions that is allowed in a WHERE clause of a SELECT statement
"rule" refers to a single embodiment of a single rule condition
"rule set" refers to a set of rules that can be evaluated together.

A rule set evaluation results in a set of rules which evaluated to TRUE. A rule set is associated with a queue, and each rule corresponds to a subscriber. The rule set evaluation for a message results in a set of subscribers which should be able to dequeue the message.

As shall be described in greater detail hereafter, the subscriber bitmap of a message is used to indicate the subscribers whose selection conditions are satisfied by the message. The actual rule set evaluation to determine which subscribers are to consume a given message may be performed by the enqueuing sessions as they enqueue messages, in a background process, or by the dequeuing sessions as they dequeue messages.

The Subscriber Map

The SUBSCRIBER_MAP column of each row stores a subscriber bitmap that indicates which subscribers have selection conditions that are satisfied by the message. The SUBSCRIBER_MAP may be NULL for a single consumer queue shard, e.g. a queue shard with one subscriber. According to one embodiment, the subscriber bitmap is used in conjunction with a "lock" bitmap. A bit position on the subscriber bitmap and the same bit position on the lock bitmap together indicate the state of the message for the particular subscriber that corresponds to the position.

Specifically, the subscriber bitmap represents all subscribers to which this message is visible. The lock bitmap represents the lock status of a subscriber for this message. In one embodiment, a bit position is assigned to each subscriber, such as when the subscription between a subscriber and a queue shard is created. For example, the subscriber bitmap and the lock bitmap for a shard contains information for a specific subscriber at the bit position assigned to the specific subscriber. The assignment of bit positions may be stored in another data structure. When a subscription terminates, the data structure storing the assignment of bit positions is updated, and the subscriber's bit position can be reused for a new subscriber. Thus:

Subscriber bit=0 and Lock bit=0 means the message cache cannot process this message because it has not been determined whether the message satisfies the selection conditions of the subscriber.

Subscriber bit=1 and Lock bit=0 means this message is valid for this subscriber (i.e. satisfies the selection conditions of the subscriber) and no other dequeue for the same subscriber is working on this message yet.

Subscriber=1 and Lock bit=1 means this message is valid for this subscriber and a dequeue process for this subscriber has already locked it.

Subscriber=0 and Lock bit=1 means the subscriber finished the processing of this message and committed the dequeue.

As mentioned above, the subscriber bitmap for a message may be set by
the enqueue session at the time the message is enqueued,
a background process after the message is enqueued and before the message is processed by any dequeue session, or
dequeue sessions at the time the message is processed by the dequeue session.

Regardless of the entity that generates the bitmap, the entity evaluates the selection conditions of each subscriber against the message. The bits within the bitmap that correspond to each subscriber are then set based on whether the message satisfies the selection conditions. In the case where the bitmap is set by a dequeue session, the first dequeue session to process the message may set the bitmap for all subscribers so that subsequent dequeue sessions merely need to inspect the bitmap. In an alternative embodiment, each dequeue session may evaluate the message only relative to its own selection conditions, and only set the bits of the bitmap that correspond to its subscriber.

Message Cache

To avoid the overhead associated with accessing queue table 300 every time a message needs to be dequeued by a subscriber, a message cache is maintained in volatile memory. In one embodiment, the message cache is stored in the shared memory of a database instance. Using the message cache avoids costly SQL operations to access queued messages. When sufficient memory is available, the message cache caches all messages in sharded queues on a database instance, which includes messages and any metadata, locks, subscribers, and transaction states needed to manage the messages.

The message cache provides a fast in-memory access path to all queuing functionality including enqueue, dequeue, and notification so that clients of the message cache do not need to read, sort, and lock data in database tables.

Message Cache Structure

According to one embodiment, the message cache is a specific in-memory structure that stores active messages in order to avoid costly SQL operations. Most queue operations will take place in memory and experience minimum disk latency if there is shared memory available.

Each message cache contains a well-organized set of data structures to store and retrieve persistent and non-persistent messages and the associated metadata. According to one embodiment, a message cache is created per queue per instance.

The message cache can be accessed via queue metadata. According to one embodiment, each message cache can contain two types of messages: persistent and non-persistent messages. Persistent messages will persist in the message cache and in a database table until it is consumed and removed. On the other hand, a non-persistent message will be present only in the message cache and not in a database table.

Memory in the message cache can include one or more fixed-memory portions and variable-memory portions. For example, a fixed-memory portion may be configured to contain the metadata of one or more messages enqueued in the message cache. Some examples are message cache handle, shard handles, subshard handles, transaction hash tables, commit callbacks, and subscriber hash tables.

A variable-memory portion of the message cache is usually dependent on the data or payload and the properties associated with the messages. For example, the payload of enqueued messages may be stored in a variable-memory portion. For example, one or more buffers, such as the circular buffer described below, may be used to implement the variable-memory portion. The fixed-memory portions and variable-memory portions may be interspersed—the structures described herein are an example implementation.

Circular Buffers

The circular buffers described above may be used to represent subshards in the message cache. Each subshard contains a circular buffer in the message cache. The subshard contains a pointer to its circular buffer. The circular buffer is a list of chunks which form a circular list. The circular buffer size can vary from one subshard to another, depending on the number of messages in a subshard and the size of each message.

The virtue of a circular structure is the ease of memory reusability; the circular structure can simplify the garbage collection process and reduce the potential memory fragmentation. Messages of a subshard are arranged in the circular buffer according to their enqueue time, the data structure being a good match for the message ordering scheme.

A circular buffer can cache a part of a subshard or a whole subshard. According to one embodiment, there is 1:1 mapping between circular buffers and subshards. For each message in a subshard, the corresponding buffer contains either the whole message, metadata only (if the payload is too big), or nothing (in case of memory shortage). A buffer can accommodate multiple transactions, and a transaction can span multiple buffers. If a rollback happens, the memory allocated for the transaction is unavailable until the circular buffer is recycled.

When a new subshard is allocated in the message cache, the circular buffer includes an initial number of chunks of memory that are allocated for storing new messages, if memory is available. When the database instance is short on memory, no circular buffer is allocated, and the messages in the subshard are only in the queue table. When there is no more memory in the chunks to store a new message, at least one new chunk is allocated to the circular buffer of a subshard provided more messages can be stored in the subshard and memory is available. The circular buffer that corresponds to a subshard is freed when dequeue for the subshard has been completed by all subscribers.

Figure 4:
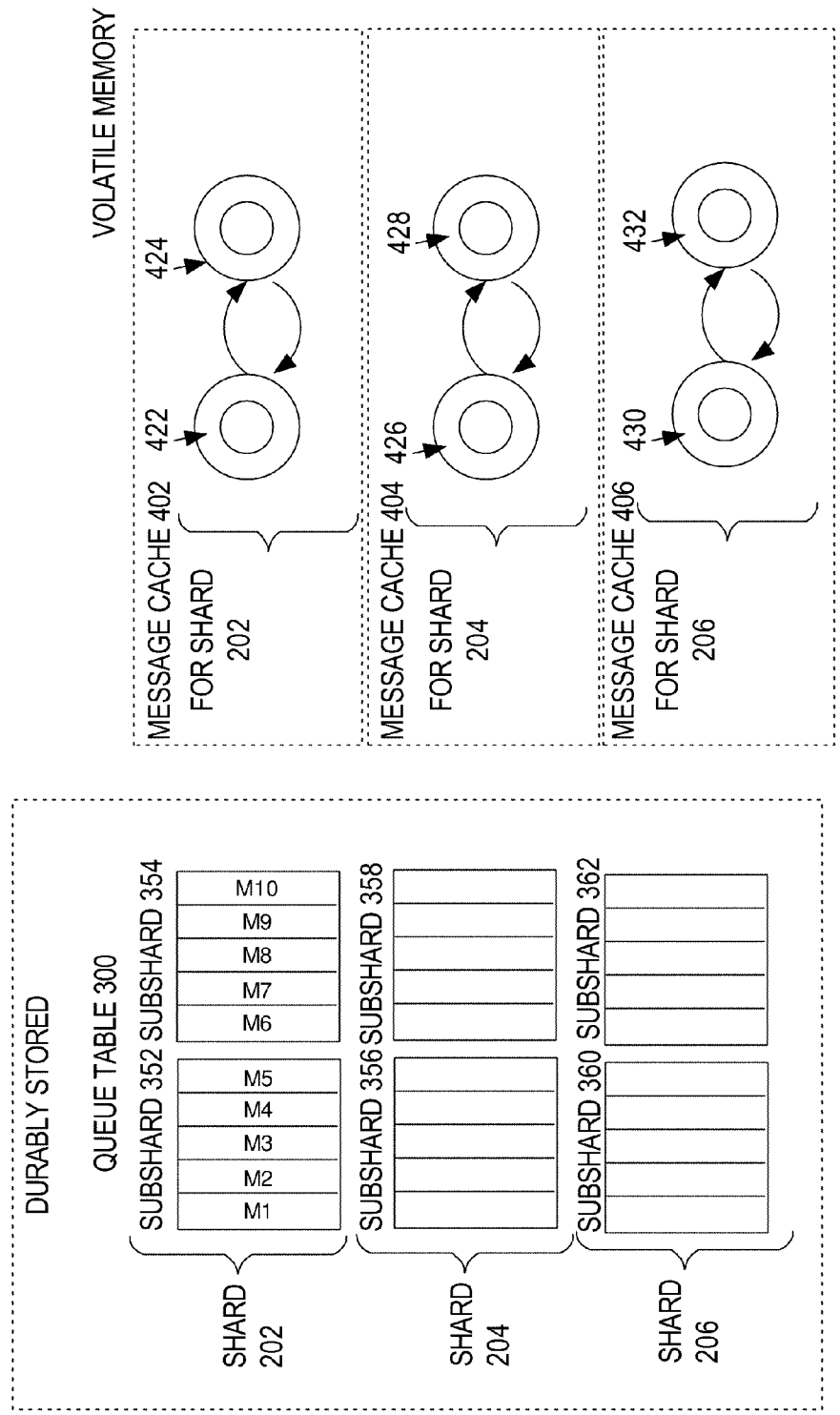
FIG. 4 is a block diagram illustrating message caches, according to an embodiment.

Referring to FIG. 4, it illustrates message caches 402, 404 and 406 that store cache entries for the shards of sharded queue 200. Specifically, message caches 402, 404 and 406 respectively store cache entries for shards 202, 204 and 206.

Each of the message caches 402, 404 and 406 stores a circular buffer for each of the subshards in the shard associated with the message cache. Specifically, in the illustrated embodiment, message cache 402 includes circular buffers 422 and 424 that respectively correspond to subshards 352 and 354 of shard 202. Message cache 404 includes circular buffers 426 and 428 that respectively correspond to subshards 356 and 358 of shard 204. Message cache 406 includes circular buffers 430 and 432 that respectively correspond to subshards 360 and 362 of shard 206.

Depending on the size, payloads can be stored in-line, out-of-line or not cached. In one embodiment, if payloads are smaller than a first threshold size, they are stored in-line. This means that payloads are stored in the entry, within the circular buffer, that corresponds to the message. The payload of a specific message starts at a specific message offset into the circular buffer, which will be described in greater detail hereafter.

If payloads are larger than the first threshold size, they are stored out-of-line. This means that payloads are not stored in the entry, within the circular buffer, that corresponds to the message. Instead, the entry will have an in-memory message handle that contains a pointer to the in-memory location which contains the payload.

According to one embodiment, if messages are larger than a second, higher threshold, then the messages are not cached. To avoid fragmentation and to conserve memory within the message cache, large payloads greater than the second threshold (e.g. size>4 k) are stored only in database tables. They are fetched from the table with SQL during dequeue.

Enqueuing Messages

When first enqueuing to a sharded queue, an enqueue session chooses a shard associated with the queue and always uses the same shard. The enqueue affinity ensures JMS session ordering requirements are met in the absence of failures because every dequeuer will see the messages each enqueuer enqueued in the correct order.

Enqueuing a persistent message in a sharded queue involves (a) storing a row in the queue table that implements the sharded queue, and (b) adding an entry for the message to the message cache. In one embodiment, a row is stored in the queue table by using SQL to insert a row in a partition of the queue table that implements the sharded queue. Thus, a message may be stored in sharded queue 200 by inserting a row into queue table 300. Multiple messages enqueued onto a sharded queue in a transaction become available for dequeue atomically in the message cache as the result of a post-commit callback.

The entry that is added to the message cache for the message initially indicates that the message state is NOT VISIBLE. Thus, the entry will be skipped by any dequeue process that is dequeuing from the circular buffer to which the entry belongs. As shall be explained hereafter, the status is changed to VISIBLE upon the commit of the transaction that is enqueuing the message.

An enqueue session enqueues a message to a shard by enqueuing the message to the latest subshard of the shard. Within a shard, the subshards are ordered by enqueue time, with the latest sub-shard having messages with the most recent enqueue times. Dequeuers navigate the subshards and the messages within the subshards maintaining the enqueue time ordering. To preserve ordering, any given enqueue session enqueues messages to only one shard of a sharded queue.

According to one embodiment, the shard to which an enqueuer is intelligently assigned is selected to improve performance and reduce traffic. Enqueuing a message may involve inserting a row into the corresponding partition on disk. Thus, while new messages may be added to sharded queue 200 by inserting a corresponding row into any of the partitions 302, 304, 306, 308, 310 and 312 of the queue table 300, the specific partition of queue table 300 into which an enqueue session inserts a row is preferably selected based on a variety of factors.

For example, in one embodiment, to reduce traffic on the interconnect between systems, each enqueue session inserts rows only into the queue table partitions that have affinity to the enqueue session. Thus, as shown in FIG. 2, the enqueue sessions executing in instance 1 enqueue messages by inserting rows into the queue table partitions (302 and 304) that implement shard 202. Similarly, the enqueue sessions executing in instance 2 enqueue messages by inserting rows into the queue table partitions (306 and 308) that implement shard 204, and the enqueue sessions executing in instance 3 enqueue messages by inserting rows into the queue table partitions (310 and 312) that implement shard 206.

Enqueue Commit

Conventional relational database mechanisms may be used to commit the rows, associated with newly added messages, to the queue table 300. Upon commit, all rows inserted by a transaction become visible to other transactions, such as the transactions that correspond to dequeuing sessions. However, additional actions must be taken to cause the message cache entries for those new messages to become visible.

For example, according to one embodiment, upon commit of an enqueuing transaction, a post-commit callback is made. The post-commit callback causes the following operations to be performed on the messages as part of enqueue commit.

Set the message state to VISIBLE.
Reset the dequeue pointer for all valid subscribers to the first message in the transaction if the dequeue pointer is ahead of it. Dequeue pointers shall be described in greater detail hereafter.

Enqueue Rollback

Under some circumstances, it may not be possible to commit an enqueue transaction. When a transaction cannot commit, all changes made by the transaction have to be rolled back. Conventional relational database mechanisms may be used to roll back the changes made to the queue table 300. However, to undo the changes to the message cache, the following operations are performed on the message as part of enqueue rollback:

Set the message state to INVALID.
For all bit positions of the message: set the subscriber bitmap bit to 0 and lock bitmap bit to 1. This indicates that the message is not of interest to any subscriber, and that the subscriber can move over the message, including the commit low watermark described in the section entitled "COMMIT LOW WATERMARK".

Enqueue Example

Figure 6:
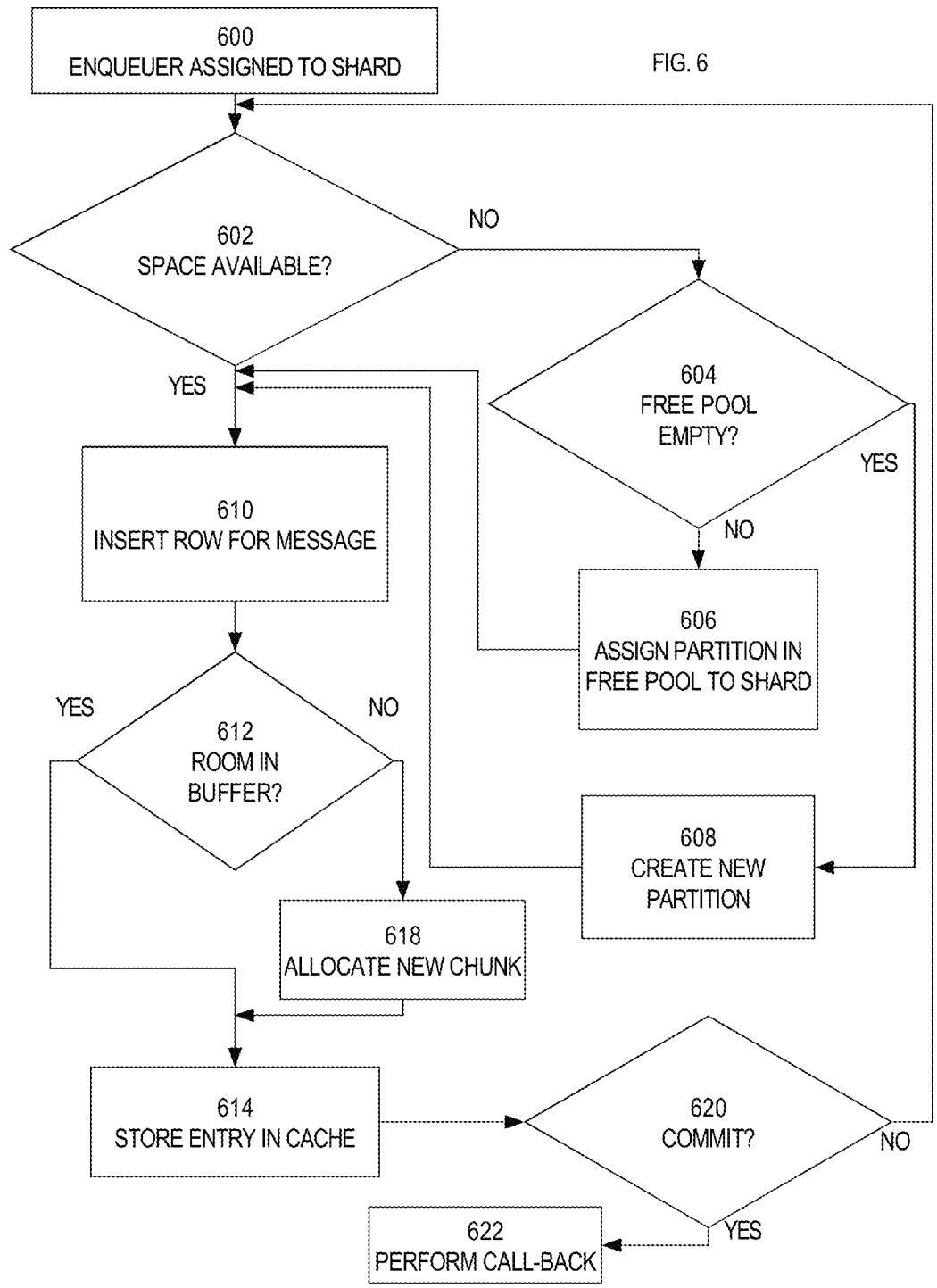
FIG. 6 is a flowchart illustrating steps performed during an enqueue operation, according to an embodiment.

FIG. 6 is a flowchart illustrating steps performed during an enqueue operation to enqueue one or more persistent messages to a sharded queue in a transaction according to one embodiment. Referring to FIG. 6, step 600, the enqueuer is assigned to a shard. As explained above, all messages of any given enqueuer are enqueued to the same shard of the sharded queue. Hence, step 600 is performed only once per enqueuer. For the purpose of illustration, it shall be assumed that, at step 600, an enqueuer X is assigned to shard 202 of sharded queue 200.

At step 602, it is determined whether there is space available, within the queue table partitions currently assigned to shard 202, for the new row. If space is available, control passes to step 610. Otherwise, control passes to step 604 where it is determined whether there is a partition available in the free pool. The free pool shall be described in greater detail hereafter.

If a partition is available from the free pool, then the partition is added to the shard from the free pool (606). Otherwise, a new partition is created and assigned to the shard at step 608. Whether from the free pool or newly created, in an embodiment where each partition is its own subshard, the newly added partition constitutes a new subshard of shard 202.

Continuing with the example, at step 602 it is determined whether subshard 354 is full. If subshard 354 is full, then it is determined whether the free pool has a partition that may be added to shard 202. For the purpose of explanation, it shall be assumed that subshard 354 is not full. Consequently, control proceeds to step 610 where a row for the message is inserted in subshard 354 of queue table 300.

In addition to adding a row for the message to the queue table, a cache entry for the message has to be added to the message cache associated with the shard. In the present example, an entry is added to message cache 402, which is the message cache that corresponds to shard 202.

To add the entry, at step 612 it is determined whether there is room for the entry in the circular buffer, in the message cache, that corresponds to the subshard in which the message was inserted. If not, then at step 618 a new chunk is added to that circular buffer. Once there is space for the new entry in the circular buffer, the entry is stored in the message cache (614).

In the present example, at step 612, it would be determined if circular buffer 424, which corresponds to subshard 354, has space for the new cache entry. For the purpose of explanation, it shall be assumed that there is space in circular buffer 424. Consequently, an entry for the new message is added to circular buffer 424 at step 614.

At this point, neither the table row for the message nor the cache entry for the message is visible to other transactions.

The row is not visible because the transaction inserting the row has not committed. Consequently, conventional relational database mechanisms will prevent other transactions from seeing the row. The cache entry is not visible because the message state is not yet set to VISIBLE.

At step 620, it is determined whether the enqueue session is committing. If the enqueue session is committing, at step 622 a call-back is performed. As mentioned above, the call-back involves setting the message state to VISIBLE, resetting the dequeue pointers for all valid subscribers of the first message in the transaction if the dequeue pointer is ahead of it.

On the other hand, if the transaction is not committing, then the enqueue session is enqueuing at least one more message. Consequently, control returns to step 602, where the process is repeated for the next message.

In the present example, it shall be assumed that the enqueue session is committing. Consequently, control proceeds from step 620 to step 622. At step 622, the call-back is performed and the entry, added to circular buffer 424, is marked as VISIBLE. In addition, if any subscribers have dequeue pointers that have passed the position, within buffer 424, of the newly inserted message, those dequeue pointers are reset to the position of the new message.

Order Preservation

According to one embodiment, messages are enqueued and dequeued in sharded queue 200 in such a way as to preserve the ordering of the messages enqueued by each enqueue session, but not the ordering of messages of one enqueue session relative to the messages of other enqueue sessions. Specifically, each enqueue session enqueues messages to only one shard, and within that shard the order of those messages is preserved. When reading from that shard, each dequeue session dequeues in that same order. Therefore, all messages enqueued in the same shard will be dequeued in the same order as they were enqueued.

The fact that each enqueue session enqueues to only one shard ensures session ordering requirements are met, in the absence of failures, because every dequeue session will see the messages each enqueue session enqueued in the correct order.

Subscribers and Dequeue Sessions

A subscriber is an entity that consumes messages. To consume messages, a single subscriber may use any number of dequeue sessions to consume messages from a single queue. In one embodiment, each dequeue session for a subscriber must coordinate its message consumption with the other dequeue sessions of the same subscriber so that the same message is not consumed more than once by the subscriber.

As used herein, the term "single consumer queue" refers to a queue containing messages to be consumed by a single subscriber, and the term "multi-consumer queue" refers to a queue containing messages to be consumed by two or more subscribers. Single consumer queues and multi-consumer queues are described for the purpose of explanation. However, any other queue type, including any hybrid queue type, may be implemented in accordance with the disclosure.

A subscriber has a dequeue pointer per shard. A subscriber's dequeue pointer for a shard is used by multiple dequeue sessions of that subscriber to dequeue messages from that shard.

Dequeuing

Because any shard of a sharded queue may contain messages that must be consumed by a subscriber to that sharded queue, each subscriber to a sharded queue must process every shard of the sharded queue. The order in which the dequeue sessions of subscribers visit the shards of a sharded queue may be determined based on a variety of efficiency factors.

In one embodiment, each subscriber may simply visit each shard in a round-robin fashion. Alternatively, load balancing may be used to ensure that no queue shard is starved of dequeue sessions at any given time. Any one of a number of techniques may be used to determine the order in which subscribers visit shards, and the embodiments described herein are not limited to any particular one of those techniques.

When dequeuing from a shard, each subscriber tracks the subscriber's dequeuing progress using (a) a dequeue pointer and (b) partitions of a dequeue log table. With respect to the dequeue pointer, the dequeue pointer of each subscriber is maintained in volatile memory and points to the next message, within the message cache, that must be processed by the subscriber. In contrast, the dequeue log table is a durably stored structure for keeping track of the dequeue process. If a failure occurs, both the dequeue pointers and message cache content may be lost. The dequeue pointer may be restored from low watermark (LWM) data (see section entitled "COMMIT LOW WATERMARK"), and the message cache with lock bitmap content may be restored using the dequeue log table.

The Dequeue Log Table

A durable subscriber is a subscriber that receives messages, whether or not the messages are published when the durable subscriber is active. On the other hand, a nondurable subscriber is a subscriber that only receives messages that are published while it nondurable subscriber is active. A dequeue log table logs all dequeues for all durable subscribers for each queue table partition i.e., subshard. This logging is on a per subscriber per message basis. Thus, there is a dequeue log physical partition per mapped queue table partition per durable subscriber. Each partition thus represents dequeues for a subscriber on a queue table partition i.e., subshard. For a single consumer queue, there is only one dequeue log partition per queue table partition. The size of the partition is same as the size of queue table partition.

Sharded queues use dequeue log table as a log to determine when to unmap (mark for recycle) a queue table partition. The dequeue log table is also used to implement various message properties like dequeue attempts, dequeue retry-delay, etc. The dequeue log table also acts as history for the dequeues.

In one embodiment, in order to avoid any row movement/chaining on future updates, the dequeue log table is created with default values set for all columns to maximum sized values of their respective types. This is possible because almost all the columns of dequeue log table contain fixed sized elements throughout its life.

In one embodiment, dequeue commit inserts a record into the dequeue log on behalf of the subscriber and the message it successfully dequeued. However, as will be explained in greater detail hereafter, in an alternate embodiment, the sharded queue architecture populates each dequeue log subshard once and reuses rows serially.

According to one embodiment, the dequeue log table of a multi-consumer queue includes the following columns:
- message id (identifier of the message that corresponds to the row)
- shard id (identifier of the shard in which the corresponding message resides)
- sequence number (sequence number of the message within the subshard)
- version number (version of this partition row)
- dequeue time (timestamp of dequeue commit)
- transaction id (identifier of the transaction the performed the dequeue operation)
- dequeue user (schema name of the dequeuer)
- subscriber (identifier of the subscriber for whom the dequeue was performed)
- retry count (current retry count)

For a single-consumer queue, the subscriber column is not necessary, since there is only one subscriber for the queue.

Example Dequeue Log Table

Figure 5:
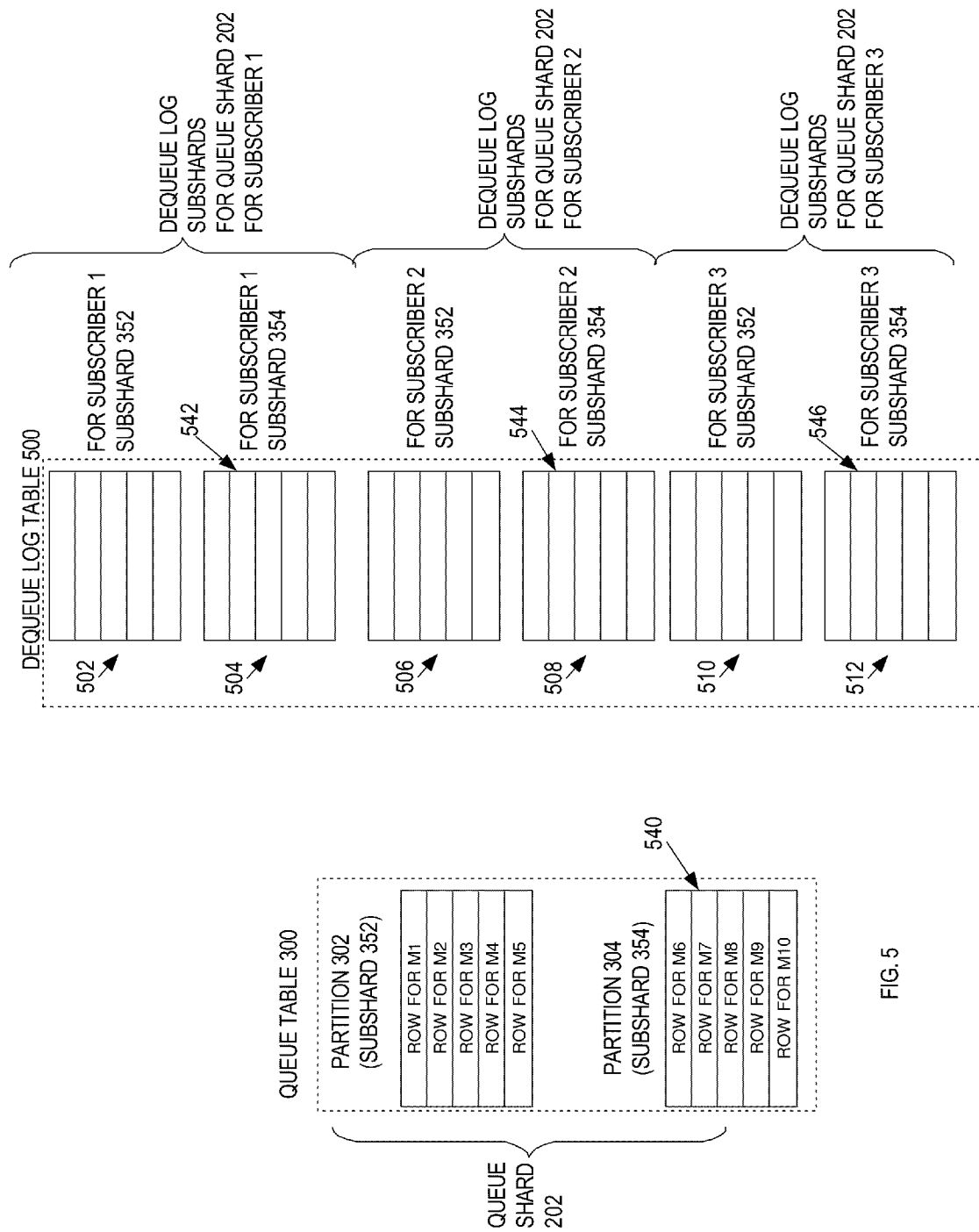
FIG. 5 is a block diagram of a dequeue log table, according to an embodiment.

FIG. 5 is a block diagram that depicts a dequeue log table 500 that is used by dequeue sessions to perform bookkeeping relative to their dequeue operations. When a queue has N subscribers at a given point in time, each active partition of the queue table has N corresponding dequeue log partitions of the same size as the queue table partition, one for each subscriber. A dequeuer updates the dequeue log to indicate it has successfully dequeued a message.

Each fixed-size partition of a dequeue log is initialized once in the background by inserting a placeholder row for each potential message in a corresponding queue table partition. Each placeholder row in a dequeue log partition has a unique sequence number column that is subsequently never updated. Each sequence number in a dequeue log partition has a single matching sequence number in the corresponding queue table partition. A session dequeuing a message will use a SQL UPDATE to modify columns other than the "sequence number" column appropriately.

In the illustrated embodiment, dequeue log table 500 is partitioned such that each subscriber is assigned one partition of the dequeue log table for each active partition of each shard from which the subscriber is dequeuing messages. Thus, if a sharded queue has X subscribers and Y shards, and each of the shards has Z active partitions of the queue table, then the total number of dequeue log table partitions currently in use to perform bookkeeping for the subscribers of the sharded queue is X*Y*Z.

Referring to FIG. 5, it illustrates a situation in which three subscribers (subscribers 1, 2 and 3) are dequeuing from shard 202. Shard 202 has two partitions (302 and 304) of queue table 300. Consequently, relative to shard 202, each of the three subscribers has two partitions of dequeue log table 500. Subscriber 1 has partition 502 to use to perform bookkeeping for partition 302 of shard 202, and partition 504 to use to perform bookkeeping for partition 304 of shard 202. Subscriber 2 has partition 506 to use to perform bookkeeping for partition 302 of shard 202, and partition 508 to use to perform bookkeeping for partition 304 of shard 202. Subscriber 3 has partition 510 to use to perform bookkeeping for partition 302 of shard 202, and partition 512 to use to perform bookkeeping for partition 304 of shard 202.

According to one embodiment, the number of rows in each partition of dequeue log table 500 is equal to the number of rows in the corresponding partition of queue table 300. For example, if partition 302 has ten thousand rows, then partitions 502, 506 and 510, respectively used by subscribers 1, 2 and 3 to perform bookkeeping for partition 302, would each have ten thousand rows. Similarly, if partition 304 has five thousand rows, then partitions 504, 508 and 512 used to perform bookkeeping for partition 304 would have five thousand rows.

Dequeue Log Table Operations

According to one embodiment, database commands are executed against the dequeue log table to use the dequeue log table to track dequeue progress. Execution of a database command, such as a SQL command, causes a database operation to be performed. Specifically, according to one embodiment, an insert operation is performed for a dequeue log table partition only during its creation i.e. add partition. The partition maintenance layer inserts the appropriate number of rows within the partition. The insert operation only inserts SEQ_NUM column, other columns are left to their default values. As the number of dequeue log partitions can be large, it is important to reduce this pre-population cost. For sharded queues, this may be done by using a 'connect by' SQL statement.

An update is performed for dequeue log table partition during dequeue on behalf of the particular subscriber to which the partition belongs. The nature of the update, as well as the use of the version number column, shall be described in greater detail below.

According to one embodiment, each fixed-size partition of the dequeue log is initialized once, in the background, by inserting a "placeholder" row for each potential message in the queue table partition that corresponds to the dequeue log partition. Each placeholder row in a dequeue log partition has a unique message sequence number in a column that is subsequently never updated. Each sequence number in the dequeue log partition has a single matching sequence number in the corresponding queue table partition. As shall be described in greater detail hereafter, each dequeue session uses a SQL UPDATE to modify columns, other than the sequence number column, when dequeuing a message.

Dequeue Pointers

According to one embodiment, each subscriber has a dequeue pointer for each shard of the sharded queue from which the subscriber is dequeuing messages. As mentioned above, the dequeue pointer for a subscriber, for a given shard, indicates the next message in the message cache available to dequeue. The dequeue pointer of a subscriber advances as the subscriber dequeues messages. If the transaction performing dequeue operations for a subscriber is rolled back, then the dequeue pointer for that subscriber moves backward to the position of the pointer at the time the transaction began. In addition, the dequeue pointer for a subscriber may move backward when a message, located at a position within the message queue that has already been passed by the dequeue pointer, is committed.

Figure 7:
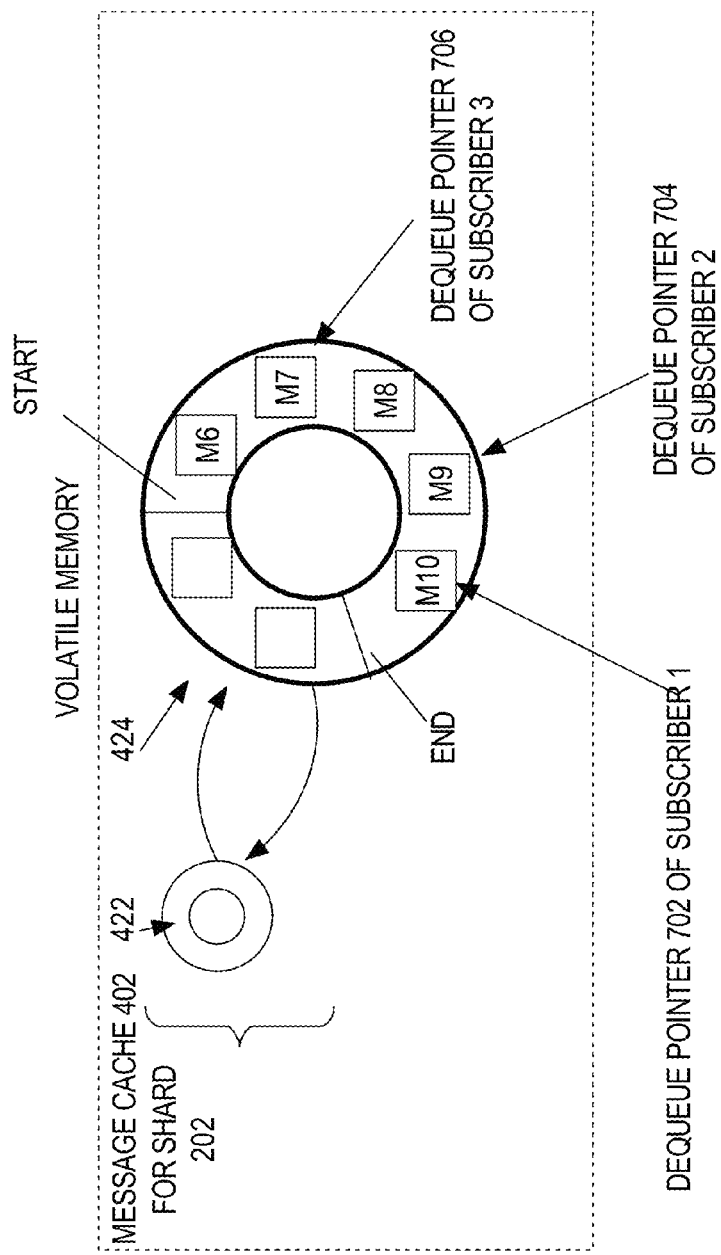
FIG. 7 is a block diagram illustrating the use of dequeue pointers to track dequeue progress of subscribers, according to an embodiment.

Referring to FIG. 7, it illustrates a scenario in which three subscribers are dequeuing messages from subshard 354 of shard 202. Circular buffer 424 corresponds to subshard 354, so the dequeue pointer of each of the subscribers indicates the position, within circular buffer 424, of the next message for the subscriber to dequeue.

Specifically, subscriber 1 has dequeued messages M6 to M9. Consequently, the dequeue pointer 702 of subscriber 1 points to the message cache entry associated with message M10. Subscriber 2 has only dequeued messages M6 to M8.

Consequently, the dequeue pointer 704 of subscriber 2 points to the message cache entry associated with message M9. Subscriber 3 has only processed message M6. Consequently, the dequeue pointer 706 of subscriber 3 points to the message cache entry associated with message M7.

The dequeue pointer contains two pieces of information that determine the visibility of messages in uncached subshards and the visibility of messages in cached subshards. We discuss these two pieces of information in turn.

The database maintains a logical timestamp of commit operations in the form of an SCN (System Change Number). The dequeue pointer contains an SCN so that dequeuers can use flashback query at this SCN to get a transactionally consistent view of uncached subshards. When a transaction that enqueues messages on sharded queues commits, the current SCN is stored within each dequeue pointer of these sharded queues. Dequeue sessions can also use the database current SCN to update the SCN in the dequeue pointer.

The dequeue pointer also stores an incarnation number that represents enqueue commit order for a shard. The incarnation number is an in-memory equivalent of the SCN and provides a transactionally consistent view of cached subshards. On enqueue commit, this incarnation number is updated and stored both within each cached message that is enqueued in the transaction and also in each corresponding dequeue pointer.

The SCN and incarnation number together provide a transactionally consistent view across both uncached subshards and cached subshards. These two pieces of information ensure session-level ordering of enqueued messages is observed by dequeuers that dequeue from uncached and cached subshards.

Commit Low Water Mark

According to one embodiment, every subscriber state contains a commit low watermark (LWM). The LWM of a subscriber represents a position within a shard below which none of the messages are of interest to the subscriber. This value is also durably stored to ensure it will not be lost in the case of a failure. In one embodiment, a LWM table is maintained on disk to track subshards that have been completely dequeued by the subscribers.

Every dequeue commit for a subscriber tries to move the watermark forward as much as possible. The commit function typically starts from the current watermark position (subshard-message) and moves it above all subsequent messages whose subscriber bit and lock bit for the particular position has value (0,1).

This movement stops on the message which does not have the above value. If, in this process, the commit watermark moves over a subshard (indicating that the subscriber has dequeued all messages in the subshard), then an indication that the subscriber has completed dequeuing the subshard is stored. When all subscribers to a shard have indicated that they have competed dequeuing a subshard, then (a) the partition(s) associated with the subshard is truncated, and (b) the circular buffer used to cache messages for the subshard can be deallocated.

Because messages cannot be processed by subscribers before the transactions enqueuing the messages are committed, all messages that precede the commit low water mark will necessarily have been committed. Therefore, there will not be any in-flight enqueuing transaction or dequeuing transaction involving a message that precedes the commit low watermark.

The global LWM (Low Water Mark) is the minimum LWM value across all subscriber LWMs for a shard. Below a global LWM of all subscribers, no messages are of interest to any subscriber. Subshards below the global LWM can therefore be deleted, unmapped or otherwise removed at any time without affecting any subscriber.

Fully-Dequeued Table-Queue Partitions

After all subscribers of a sharded queue have processed the messages of a table queue partition that belongs to the sharded queue, the table queue partition is considered "fully-dequeued". Thus, all partitions that are below the current commit low watermark are fully-dequeued table-queue partitions. According to one embodiment, rather than delete individual messages after the messages have been consumed by all subscribers, messages are deleted in batches by truncating table queue partitions that have become fully-dequeued.

According to one embodiment, once truncated, the table queue partitions are returned to a "free pool" of table queue partitions that may be reused when room is needed for new messages that need to be enqueued in the sharded queue.

Dequeue Operations

In general, a dequeue session dequeues a persistent message by temporarily marking the message in the message cache as being dequeued, and by using SQL to update the appropriate row in a dequeue log partition. A post-commit callback updates the state of dequeued messages in the message cache.

According to one embodiment, the dequeue operations for a subscriber include:
Iterating over all messages from the dequeue pointer of the subscriber,
Determining whether the message satisfies the message selection conditions, if any, associated with the subscriber,
Determining whether each message has already been dequeued by the subscriber,
Sending to the subscriber each message that (a) satisfies the message selection conditions and (b) has not already been dequeued by the subscriber.
Temporarily marking each message in the message cache as being dequeued by the subscriber
Updating the appropriate row in the appropriate dequeue log partition; and
Making a post-commit callback to update the state of the dequeued messages in the message cache Returning to FIG. 5, each message that is stored in sharded queue 200 corresponds to the one row in queue table 300. For example, a message M7 that is enqueued in sharded queue 200 may be stored in row 540. As illustrated in FIG. 5, row 540 is the second row in partition 304 of queue table 300.

When a subscriber successfully dequeues a persistent message, the subscriber updates its dequeue log to indicate that it has successfully dequeued the message. Specifically, the subscriber updates the row, within its dequeue log, that corresponds to the row, of the queue table, for the dequeued message. In addition, the subscriber temporarily marks the message in the message cache as being dequeued.

In the present example, after dequeuing message M7, subscriber 1 would update row 542 of partition 504, which is the dequeue log row, for subscriber 1, that corresponds to row 540 of partition 304. Similarly, after dequeuing message M7, subscriber 2 would update row 544 of partition 508, which is the dequeue log row, for subscriber 2, that corresponds to row 540 of partition 304. After dequeuing message M7, subscriber 3 would update row 546 of partition 512, which is the dequeue log row, for subscriber 3, that corresponds to row 540 of partition 304.

Dequeue Commit

When a transaction that has dequeued messages for a subscriber commits, a post-commit callback operation is performed to update the state of the dequeued messages in the message cache. Specifically, in one embodiment, the following operations are performed on dequeue commit.

For the bit position of the subscriber for the message set the subscriber bitmap bit to 0 and lock bitmap bit to 1.

Try to move the commit low water mark forward from its current position. A commit low water mark can be moved over a message if the subscriber bit is 0 and lock bit is set to 1.

If the transaction commit completed the dequeue of a subshard, store the subshard number within the LWM table on disk. This indicates all messages below the updated subshard number are not of interest to the subscriber for the shard.

Dequeue Rollback

In the case that a dequeue session cannot commit, the dequeue session may be rolled back. According to one embodiment, the following operations are performed on a dequeue rollback:

For the bit position of the subscriber for the message, set the lock bitmap bit to 0 indicating initial state of the message.

Reset the subscriber's dequeue pointer to this message only if the subscriber's dequeue pointer is ahead of the message.

Recycling/Reuse of Queue Partitions

As mentioned above, when a new queue table partition is needed to store incoming messages, the partition is obtained from a free pool if the free pool is not empty. Queue table partitions are added to the free pool when the messages they contain have been fully dequeued.

Specifically, according to one embodiment, partitions of the queue table are cycled from state "unmapped/free" to "mapped/in-use" to "unmapped/free" like reusable resource units from a pool. Once all the subscribers have dequeued a subshard, the partition mapped to the subshard is truncated and made available for reuse by a future subshard at the same instance.

Truncating Queue Table Partitions

When a dequeue commit happens, and the transaction was such that its dequeue position advanced across a subshard boundary to the next subshard, then the commit time callback stores an indication that the corresponding subscriber has completed the dequeue of the subshard. If the dequeuer was the final subscriber that needed to dequeue from the subshard which it switched from during the transaction, then that subshard could be freeable and truncatable.

On receiving the indication, a background process recalculates, such as from existing subscriber commit LWMs, the global LWM for the shard. If there is something which is found freeable below the global LWM (which indicates the subshard below which everything is dequeued), then a background process frees the subshards and truncates the partitions mapped to those subshard.

According to one embodiment, a SELECT query is used to identify all the partitions in the queue table map which are mapped and are below the Global Minimum LWM. These partitions are organized into one or more disjoint batches. Partition truncation is done one batch at a time by providing a list of partitions in a batch to ALTER TABLE TRUNCATE. After each batch of partitions is truncated, an UPDATE statement is used to unmap the partitions in the batch by clearing the shard, priority, subshard and map_time columns of the records corresponding to those partitions.

Unmapping Queue Table Partitions

An update is done on each fetch of the SELECT query, mentioned above, to unmap the partition i.e. to unmark the shard, priority, subshard and map_time columns of the partition record. While the SELECT fetched all rows/partitions below the Global Minimum LWM and all are truncated, a commit is issued which will commit the update statement which unmapped the partition record. Each truncate DDL was committed immediately with an autonomous transaction.

Reusing Queue Table Partitions

Once partitions are unmapped, they satisfy the condition of the SQL query which loads free partitions from the dictionary to refill the prefetch cache. On next prefetch refill query they are picked up using ORDER BY and put towards the head of the prefetch cache so that they can be reused.

The partitions are made available to reuse quickly by using ORDER BY and putting into the consuming end of the cache, so that the queue can be served using the minimum number of distinct partitions possible, for the benefits of locality of reference, cache trails, etc. of recently used resource.

Overview of Reuse of Dequeue Log Partitions

According to one embodiment, the dequeue log table includes a VERSION column that permits serial reuse of dequeue log partitions without the need for a SQL TRUNCATE or SQL UPDATE on the dequeue log partition each time the dequeue log partition is reused.

Specifically, when a dequeue log partition is created, a "0" is stored in the VERSION column of every row in the partition. In addition, metadata is stored in a data dictionary to indicate that "1" is the current version of the partition. Each time a dequeue log partition is reused, the version number for the dequeue log partition is updated in the data dictionary. Thus, when the dequeue log partition is reused for the first time, the version number will be updated to "2", and when reused for the second time the version number will be updated to "3".

Any row within a dequeue log partition whose VERSION column is less than the version identified for that dequeue log partition in the data dictionary is treated as empty. Thus, if a dequeue log partition has five rows, and the VERSION column of those rows respectively contain the values 2, 2, 1, 0, 2, and the current version of the dequeue log partition is "2", then the third and fourth rows within the dequeue log partition are treated as empty.

When a dequeue log partition is no longer in use, the current version number for the dequeue log partition, which is maintained in the data dictionary, is incremented by 1. Incrementing the current version effectively invalidates all rows currently in the dequeue log partition.

Because the current version number is incremented with each reuse of the corresponding dequeue log partition, there is a possibility that the version number will eventually "overflow". According to one embodiment, to prevent such overflow, a background process may use a database transaction to both (a) reset the current version to 1, and (b) update the VERSION column of all rows within the partition to "0" when the version number reaches a threshold.

Recycling/Reuse of Dequeue Log Partitions

As explained above, recycling/reuse of dequeue log partitions is very different from how queue table partitions are recycled. Specifically, dequeue log partitions are not reused using a conventional truncate DDL. Since a fixed number of same shape records, containing all fixed sized columns, is what is stored in dequeue log partitions, the dequeue log is designed to be reused without expensive truncate DDLs.

The dequeue log stores one row per message, per subscriber. Subshard-size number of rows is the maximum number of rows which can be stored in a dequeue log partition. In one embodiment, the default subshard size is 2000. One row per message is logged with the sequence number of the message as the key.

At partition creation time, 2000 empty rows are inserted into a dequeue log partition with just the sequence number column inserted. Using this sequence number column, a session dequeuing a message does not insert a dequeue log record, but updates an existing empty row in the dequeue log. This update over previous rows is used in subsequent reuse of dequeue log partitions, to reuse the partition without truncate.

Dequeue Log Partition Pre-Population

When a dequeue log partition is created, in the same transaction empty rows are inserted in the partition. For the purpose of explanation, it shall be assumed that the dequeue log partition has 2000 rows. At this point, only the values 0 to 1999 are inserted into the seq_num column. The 2000 rows form a place holder for the dequeue log information which will be updated into these rows during dequeues. No later insert is required.

According to one embodiment, there is only one index on the dequeue log, and it is on the seq_num column. Since the sequence number is inserted during pre-population, the index on whole partition is created during pre-population which happens in most cases in a background process. This index, once built, is not required to be maintained rest of the life of the partition because the seq_num column is never changed. So on each reuse of a dequeue log partition, new dequeue log records are updated into the partition, but the index is not required to be maintained during foreground dequeue operations.

Dequeue Log Partition Reuse Using Row Markers

According to one embodiment, the metadata record of each dequeue log partition (in the dequeue-log partition map table) has a column which stores a value called row marker for the partition. When a partition is created, the value is initially 1.

The dequeue log table also has a VERSION column. The value stored in this column in a record indicates whether a dequeue log row is virtually present in this record or not.

If a dequeue log VERSION column in a row of a dequeue log partition is "marked" with the row marker value in its metadata, then it signifies that the subscriber has dequeued the corresponding message.

When dequeue log information for a message is updated into a record in the prepopulated dequeue log partition, the present Row Marker of the partition from its metadata is stored into the VERSION column of the dequeue log record.

While looking to check if a message is dequeued by a subscriber or not e.g., by reload, etc., the row marker value of the partition is picked from the metadata and each row of dequeue log partition is checked for this row marker value. If the row marker is found in the row, the message is dequeued (dequeue log row is present).

When a dequeue log partition is unmapped, the partition is not actually truncated. The rows are left just as is, but the row marker in the partition metadata in partition map is incremented from its previous value. The row marker can have several values to signify the status of the message for the subscriber. In one embodiment, the value starts from 1 and on next reuse of the partition is incremented by 5.

A row in a partition can have a version value as an offset from corresponding row marker stored in dequeue-log partition map table. The following are the offset values:
0=dequeue committed
1=this message is not qualified for this non-durable subscriber
2=background process committed this message
3=message rolled backed and retry updated
4=message reached maximum retries
5=truncate marker offset: The final offset version representing next legitimate row marker and version value. This offset represents reuse of the dequeue-log partition.

When a truncatable partition is unmapped, its row marker value in metadata is incremented. The existing rows in the partition virtually disappear because the reader expects the new incremented row marker value in the rows for a valid row. Thus all old rows with smaller values of row marker are interpreted as not present.

Row Marker Wraparound

Since the row marker is incremented on every unmap and a partition can be reused an indefinite number of times, the row marker cannot be incremented indefinitely, because it will reach the upper value of its storage. This row marker is reset to its start value i.e. 1 after a fixed number of reuse cycles. When the row marker is reset to 1, the VERSION column of all 2000 rows is set to zero. This is required to be done, because there could be still some rows which, for example, were updated only by the first use of partition with first time value of row marker=1, and now after wraparound on second time value of row marker=1, those old rows might look like dequeued on current usage of the partition.

Unmapping Dequeue Log Partitions

A dequeue log partition is unmapped when the parent queue table partition is being truncated, and a cascaded truncate/free is called on all associated dequeue log partitions (of all subscribers). When the dequeue log partitions are unmapped, row marker update is done. Row marker reset is also done, if necessary.

In one embodiment, all these SQL updates during dequeue log partition unmap are committed only if (in same transaction of) the outer queue table parent partition unmap is committed.

Recycling/Reuse of Dequeue Log Partitions

Once dequeue log partitions are unmapped, they satisfy the condition of the SQL query which loads information about free partition from the dictionary to refill the prefetch cache. On the next prefetch refill query, partitions are picked up using ORDER BY and put towards the head of the prefetch cache, so that they can be reused.

The dequeue log partitions are made to be reused quickly by using ORDER BY and putting into the consuming end of the cache, so that the queue can be served using a minimum number of distinct partitions, for the benefits of locality of reference, cache trails, etc. of a recently used resource.

Memory Pressure

Messages may be stored on disk (such as in the queue table) as well as in-memory, such as in the message cache. When retrieving a message, obtaining the message from the message cache instead of from disk avoids costly SQL operations to access queued messages. Consequently, when sufficient memory is available, the message cache may be used to cache all messages. The messages may include any metadata, locks, subscribers, and transaction states needed to manage the messages.

As used herein, the term "memory pressure" refers to any low-memory condition with the potential to affect message caching. Memory pressure usually arises when messages are not consumed fast enough, thereby causing memory to be used faster than it is released or otherwise recycled.

A database implementing a sharded queue may be configured to detect memory pressure by identifying one or more specific low memory conditions. In a shared-disk database, memory pressure may be handled differently based on the database instance in which the memory pressure occurs, which is discussed in more detail below.

According to one embodiment, the message cache is stored in a pool of memory designated for use by the message cache. A low memory condition may be defined based on usage statistics for this pool of memory. For example, memory pressure may be detected when the current memory usage of this pool exceeds a threshold. For example, the message cache may be considered "under memory pressure" when the free space falls below 30 percent of the pool of memory, or some other threshold. In one embodiment, when performing an enqueue operation, memory pressure is checked before allocating any memory for the message within the message cache. When memory pressure is detected, the enqueue operation does not store the message in the message cache.

A sharded queue's behavior with respect to memory may be customized. For example, a queue may be allocated a memory quota and/or a priority relative to other queues. The memory quota and/or priority may be based on the importance and load of the sharded queue.

Enqueue Under Memory Pressure

In the general case, sharded queues use at least one message cache in memory to avoid always having to retrieve messages from disk. As explained above, in one embodiment, the in-memory message cache corresponds to a partition of the queue table on disk. Under memory pressure, when enqueuing a message, a decision may be made not to store the message in a message cache. Instead, only a small amount of metadata is stored in the message cache. For persistent messages that are also stored on disk in the queue table, the metadata stored in the message cache identifies the location that the message is stored in the queue table. A message stored in the queue table but not in the message cache is referred to herein as an "uncached message".

In addition to supporting uncached individual messages, entire queue shards may also be "uncached". Specifically, according to one embodiment, a queue shard may be cached or uncached based on whether memory pressure exists. When the queue shard is cached, messages are stored in both the message cache (in volatile memory) and the queue table (on disk). When the queue shard is uncached, messages are only stored in the queue table. The queue shard may be switched from cached to uncached, and vice versa, depending on memory pressure.

In one embodiment, the level of granularity at which the cache/uncache decision is made may be any one of (a) individual messages, (b) entire queue shards, and/or (c) individual subshards within a queue shard. When the caching decision is made at the subshard level, the same shard queue may contain both cached subshards and uncached subshards.

In embodiments that make the caching decision at the subshard level, a subshard of a queue shard may be either cached or uncached. For an uncached subshard, all messages in the subshard are not stored in the message cache. Rather, the message cache stores metadata that identifies the messages in the queue table, and dequeues are performed by obtaining the messages from the queue table.

The "current subshard" refers to the subshard on which enqueues are currently being performed. If the queue shard to which the current subshard belongs is cached, such as when no memory pressure is detected, the current subshard is a cached subshard. If the queue shard to which the current subshard belongs is uncached, such as when memory pressure is detected, the current subshard is an uncached subshard.

Transitioning from No Pressure to Pressure

In one embodiment, when memory pressure is first detected, the queue shard to which the current subshard belongs is changed from cached to uncached, and no new messages are stored in the buffer of the message cache corresponding to the current subshard. This may result in a partially filled buffer in the message cache and/or a partially filled partition in the queue table.

According to one embodiment, in response to detecting memory pressure, the current subshard is marked as FULL, indicating that no new messages will be accepted into that subshard. A new subshard is created and marked to be uncached. The new subshard is now the current subshard into which new enqueues are accepted.

Transitioning from Pressure to No Pressure

In one embodiment, when memory ceases to be under pressure and the current subshard is an uncached subshard, the current uncached subshard is allowed to complete. Thus, even if it is detected that memory pressure is no longer present, the uncached subshard may be used until the corresponding queue table partition is full. In other words, until the uncached subshard is full, the shard operates as an uncached shard, and messages are only stored in the queue table.

Alternatively, when the current subshard is uncached but there is sufficient shared memory available, an enqueuing session can terminate the current subshard and start using a cached subshard. To avoid a high number of changes between a cached subshard and an uncached subshard, such as when available memory is close to a condition that determines memory pressure, the uncached-to-cached transition can depend on the number of messages in the current uncached partition as well as the amount of shared memory available, or any other appropriate factor useful to avoid thrashing between states. In one embodiment, an uncached subshard may be dynamically converted to a cached subshard, which shall be described in more detail hereafter.

Enqueuing Example

Figure 11:
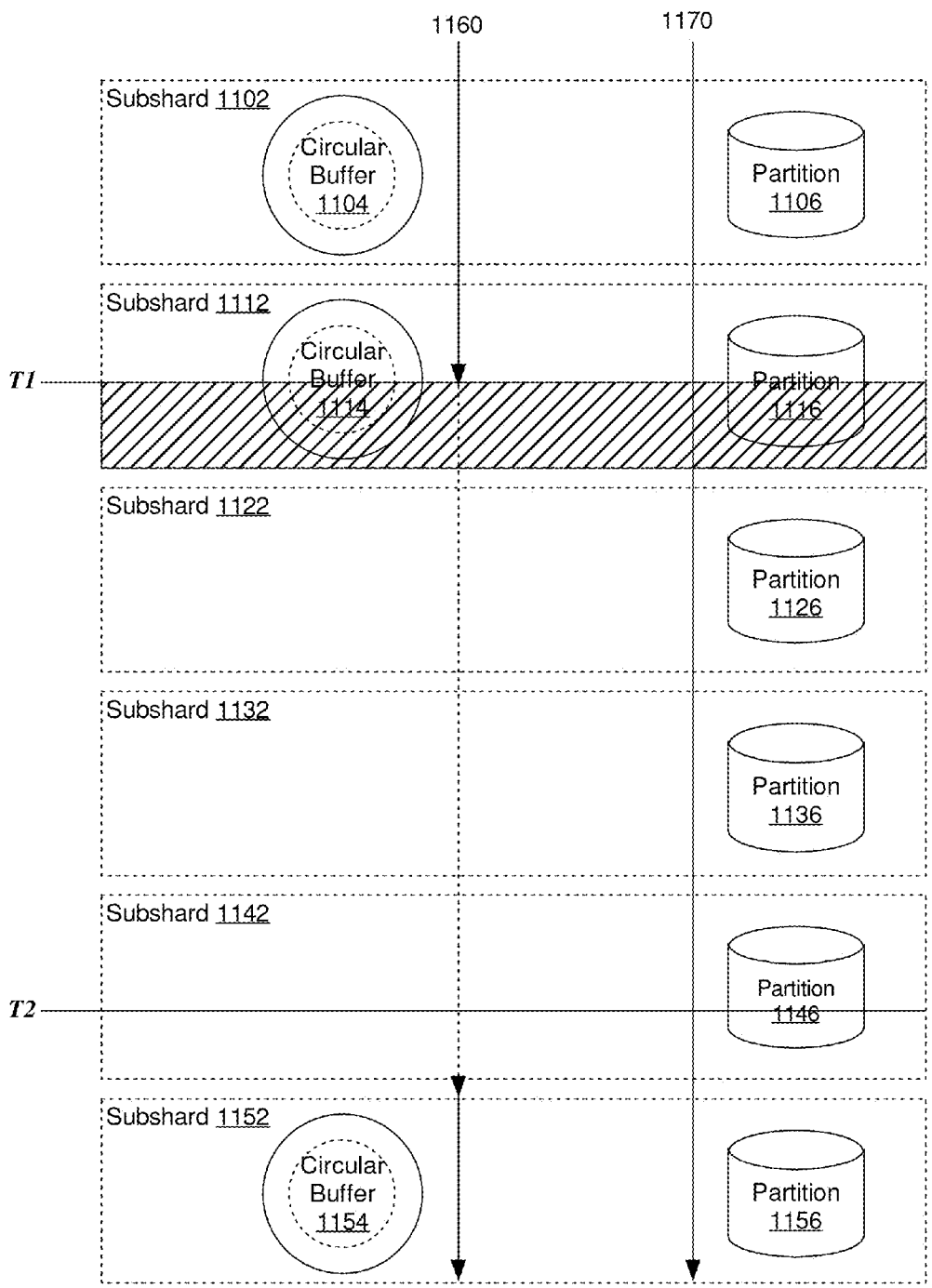
FIG. 11 is a block diagram illustrating enqueues into subshards over a time including a period when memory pressure is detected, according to an embodiment.

FIG. 11 is a block diagram illustrating, in an embodiment, enqueues into subshards of one shard of a sharded queue, over a period of time. The period of time covered in FIG. 11 includes a period when memory pressure is detected, according to an embodiment. Specifically, at time T1, memory pressure is detected. At time T2, it is detected that memory pressure is no longer present.

In FIG. 11, the vertical axis represents time, and each horizontal row indicates which subshard was the "current subshard" at any given time. Specifically, the chronological sequence of subshards that were the "current subshard" during the period depicted in FIG. 11 is: subshard 1102, subshard 1112, subshard 1122, subshard 1132, subshard 1142, then subshard 1152.

Arrows 1160 and 1170 correspond to enqueue operations performed over time on the shard that includes subshards 1102, 1112, 1122, 1132, 1142 and 1152.

Subshard 1102 is a cached subshard. When subshard 1102 is the current subshard, no memory pressure is detected. For each message enqueued into the shard, the message is stored in circular buffer 1104 and partition 1106 until partition 1106 is full.

Subshard 1112 is an uncached subshard. When subshard 1112 is the current subshard, memory pressure is detected at T1. At T1, subshard 1112 is marked as full, and no more messages are stored in either circular buffer 1114 or partition 1116.

Memory pressure is detected from T1 to T2. Subshards 1122 and 1132 are uncached subshards. Subshards 1122 and 1132 are current subshards that fall completely within the period T1 to T2. When subshard 1122 is the current subshard, messages are only stored in partition 1126. When subshard 1132 is the current subshard, messages are only stored in partition 1136. Even though the messages themselves are not stored in the message cache during periods of memory pressure, message metadata may still be stored in the message cache, such as in a fixed-memory portion of the message cache (not shown).

Subshard 1142 is an uncached subshard because there is memory pressure at the time subshard 1142 becomes the current subshard. At T2, while subshard 1142 is still the current subshard, it is detected that memory pressure is no longer present. Although it is detected that no memory pressure is present, the subshard 1142 is allowed to complete until partition 1146 is full. As mentioned above, message metadata may still be stored in the message cache, such as in a fixed-memory portion of the message cache (not shown).

Subshard 1152 is the next subshard created after T2. Because subshard 1152 becomes the current subshard when memory pressure is no longer present, subshard 1152 is created as a cached subshard. Thus, while subshard 1152 is the current subshard, each message enqueued into the shard is stored both in circular buffer 1154 and in partition 1156, until partition 1156 is full.

Adapting to Changes in Memory Pressure

According to one embodiment, as the amount of available shared memory changes, the sharded queue automatically adapts. As shown in the embodiment of FIG. 11, even if it is detected that memory pressure is no longer present, an uncached subshard may continue to be used until the corresponding partition is full. Alternatively, in response to detecting that memory pressure has ceased, an enqueuing session can terminate the current uncached subshard and start using a cached subshard.

A cached subshard may be dynamically converted to an uncached subshard, such as to make more memory available. For example, in a shared-disk database, when an instance of the shared-disk database restarts, cached partitions are read into shared memory. In this scenario, cached subshards that have not been processed by slow dequeuers can occupy shared memory for a long time. Dynamic conversion of a cached subshard to an uncached subshard can reduce the amount of memory allocated to existing subshards in this and other scenarios.

Conversely, an uncached subshard may be dynamically converted to a cached subshard. For example, when sufficient free memory is available, converting an uncached subshard into a cached subshard may make dequeue operations on these subshards more efficient.

Sequence Number Indexes

There are two kinds of sharded queue partitions for a queue table: cached and uncached. Messages in a cached partition correspond to a cached subshard and are also stored in the message cache. Messages in an uncached partition correspond to an uncached subshard and are not stored in the message cache. Every message that is stored in a partition has a unique "sequence number" within the partition. The sequence number represents the relative message order based on enqueue time of a message within a subshard and corresponding partition. Typically, for a cached subshard, the message is dequeued by reading from the message cache rather than the corresponding partition.

In some circumstances, such as when one or more instances are under memory pressure, messages are not cached in the message cache. In one embodiment, for such uncached partitions, the sequence numbers of these uncached messages are indexed. For example, the sequence number may be stored in an indexed column of the queue table. To dequeue a specific message from a queue table partition, the queue table partition needs to be searched for the particular sequence number corresponding to the specific message. The sequence number index facilitates efficient dequeuing of a message from the queue table.

Because messages stored in cached partitions are typically dequeued from the message cache rather than the queue table, it is not essential to index the sequence numbers for these messages. To reduce the costs of index maintenance, the sequence number may be recorded in different columns of the queue table for cached partitions and uncached partitions. The column corresponding to the uncached partitions is indexed in a sequence number index, while the column corresponding to the cached partitions is not indexed. Because the indexed column is not populated for messages in a cached partition, the number of entries in the sequence number index is reduced. In one embodiment, the unindexed column is a virtual column derived from the column containing the message identifier. When queried, virtual columns appear to be normal table columns, but their values are derived rather than being stored on disk.

Preserving Transaction Atomicity

An enqueuing session can enqueue messages in both cached and uncached partitions for the same queue shard. Transaction commits, transaction rollbacks, and rollbacks to a savepoint are handled consistently across the queue table, the dequeue log, and the message cache. To preserve transaction atomicity, messages that were enqueued by the same transaction in cached and uncached partitions of the same message queue shard become visible to a session dequeuing from that shard at the same time.

According to an embodiment, a database maintains a logical timestamp to uniquely identify the order that any database operation occurred relative to another database operation. In one embodiment, the logical timestamps are based on an actual system time, a counter, or any other data that identifies order. In one embodiment, each cached message has an incarnation number, representing the logical commit timestamp of the transaction that enqueued this message.

A flashback query provides a mechanism for viewing data as it existed at a prior point in time. Flashback queries are described in U.S. Pat. No. 7,689,549, which is hereby incorporated by reference. According to one embodiment, when examining an uncached partition, a dequeuer uses a flashback query based on the System Change Number (SCN) stored within the dequeue pointer. By using a flashback query with the SCN of the dequeue pointer, enqueued messages associated with transactions that committed at a later logical timestamp will not be selected for dequeue.

In one embodiment, the flashback query uses the sequence number index to avoid sorting messages within the partition while looking for undequeued messages. When examining a cached partition, a dequeuer scans cached messages in enqueue order but ignores messages whose incarnation number is larger than the incarnation number component of the dequeue pointer being used. A dequeuer unable to dequeue messages on a shard will periodically refresh its SCN/incarnation number pair and look for enqueued messages that were recently committed. A post-commit callback for enqueuing transactions captures the current SCN, derives an incarnation number from the SCN, and updates all cached messages enqueued to sharded queues in the transaction with the new incarnation number.

These methods ensure that all messages within the same enqueue transaction are visible atomically, and that dequeue operations follow enqueue session level ordering correctly.

Shared-Disk Database

A shared-disk database includes multiple instances configured to access a single database. One example of a shared-disk database is the Oracle Real Application Clusters (RAC). Oracle RAC includes multiple servers or hosts connected to each other by a high bandwidth, low latency interconnect. The interconnect is a private network that connects all of the instances of the shared-disk database. The system appears as a single database server to end users and applications. Various techniques provided herein may apply to multiple instance database configurations. Furthermore, the techniques provided herein, as applied to multiple instance database configurations, are not limited to Oracle RAC, and may apply to any proprietary and/or standardized shared-disk database architecture.

Shard Ownership for Enqueue Session on a Shared-Disk Database

In a shared-disk database, a shard is ideally contained within a single instance. In this case, all sessions enqueuing on the shard and dequeuing from the shard are connected to the same instance. When more flexibility is needed for a given subscriber, the instance on which the dequeuing occurs for that subscriber can be different than the instance on which the enqueuing occurs. In this case a database background process (referred to herein as the "cross-process") sends messages from the message cache in the enqueuing instance to the message cache in the dequeuing instance. In a shared-disk database, a load balancer may make decisions on adding, removing, or changing cross processes. Embodiments of load balancers and cross processes are described in greater detail hereafter.

When one instance of the shared-disk database has the exclusive right to enqueue on a specific shard, it has enqueue ownership of the specific shard. Enqueue ownership of a shard is typically with the instance which created the shard. Enqueue ownership for shards ensures that no two enqueue sessions at different instances can enqueue in the same shard. In one embodiment, enqueue ownership of a shard assigned to a specific instance is always fixed and never changed until the specific instance is no longer alive. In case of death of an instance owning shards, enqueue ownership of such shards may be assigned to other alive instances, such as by load balancer.

Enqueue ownership information for all shards may be stored in a database dictionary table. For example, the enqueue ownership table may include the following columns:

QUEUE (specifies a sharded queue)
SHARD (specifies a shard of the specified sharded queue)
ENQUEUE_INSTANCE (specifies an instance of a shared-disk database where the specified shard is created; the specified instance may have enqueue sessions to the specified shard).

Any enqueue session at the specified instance will perform enqueues in a shard associated with the enqueue instance. In one embodiment, the enqueue session continues to enqueue all its messages for a queue in the same shard in its lifetime, so as to preserve the order of messages enqueued by the session. The enqueue sessions of an instance may be distributed across the shards associated with the instance using a round-robin assignment scheme, a load-balancing assignment scheme or any other assignment scheme.

The enqueue ownership table may include additional columns, such as to facilitate the addition and removal instances, such as in an embodiment that shall be described in greater detail hereafter.

Shard Ownership for Dequeue Session on a Shared-Disk Database

For a specific shard and a specific subscriber, the instance of a shared-disk database that has the right to dequeue from the specific shard on behalf of the specific subscriber has "dequeue ownership" of the specific shard relative to the specific subscriber. For example, if instance X has dequeue ownership of shard Y relative to subscriber Z, then only instance X can dequeue messages from shard Y on behalf of subscriber Z.

Allowing only a single instance to dequeue from a given shard for a given subscriber ensures all data manipulation commands on the shard for dequeue purposes is done on a single instance for the given subscriber. Dequeue ownership may be enforced for a specific shard such that no two dequeue sessions at different instances can dequeue from the specific shard on behalf of the same subscriber. However, a subscriber can dequeue from two different instances from two different shards of the queue at the same time. For example, while instance X is dequeuing messages from shard Y for subscriber Z, another instance A can be dequeuing messages from another shard B for subscriber Z, conversely, instance A cannot dequeue messages from shard Y for subscriber Z however, instance A can dequeue messages from shard Y for another subscriber Q. Thus, a dequeue session can concurrently dequeue messages for a subscriber of a queue from different shards, where enqueue ownership of such shards is owned by dequeue instance or instances other than dequeue instance.

According to one embodiment, dequeue ownership of a shard for all subscribers of the queue remains with the enqueue instance of the shard. In one embodiment, this causes local dequeues (i.e. in memory from a message cache local to the instance), increasing performance and scalability by avoiding message copy across instance and reducing memory footprint. In another embodiment, dequeue ownership of some subscribers for a shard can be assigned to a non-enqueue owner instance to ensure effective draining of shards based on eagerness/capacity of dequeue session in certain instances. A load-balancer is typically responsible for deciding whether such a change in dequeue affinity can be done.

Dequeue ownership may be described using a tuple that identifies the following fields: Queue, Subscriber, Shard and Dequeue Instance. For the specified sharded queue, the specified subscriber can dequeue from the specified shard at the specified instance. In one embodiment, each subscriber has a dequeue session on each instance, the dequeue session of each specific instance dequeuing from one or more shards associated with that instance.

In one embodiment, there are cases where a subscriber does not dequeue messages from all shards and/or does not have a dequeue session on one or more instances, such as due to application design. For example, for a non-durable JMS subscriber, dequeues for a particular subscriber happen at a single instance or at less than all of the instances that are alive, and messages from shards at other instances are expected to be dequeued at the instance where subscriber's dequeue session is present.

Dequeue ownership of a shard for a subscriber is not fixed and can be changed to different instances to drain the shards across instances. For example, this allows non-durable JMS subscribers to the sharded queue. However, at any point of time, a subscriber can dequeue from a shard at any single instance. Therefore, enqueue ownership and dequeue ownership of a shard may be with different instances for a particular subscriber. In such cases of ownership mismatch, message forwarding mechanisms may be configured to detect the ownership mismatch and forward the messages for subscriber from the enqueuing instance to the dequeuing instance seamlessly, such as by one or more cross processes.

Load Balancer

In a shared-disk database, a load balancer may automatically perform load-balancing procedures. Load-balancing may be performed based on one or more factors, such as:
Enqueue rate
Dequeue rate
Message backlog
Available memory
CPU usage
Message throughput
Message latency.

Furthermore, additional factors may be used in addition to these example factors. Different local and/or global policies may be implemented in a shared-disk database.

For example, consider a load-balancing policy that defines load as latency, where latency is amount of time a subscriber would take to dequeue all the messages at an instance based on factors such as past enqueue rate, past dequeue rate, current backlog, predicted enqueue rate, and predicted dequeue rate of that particular subscriber. In this case, "load" calculations are unique to a subscriber-instance pair. If enqueue rate is higher than dequeue rate of a subscriber at an instance, that instance is "loaded" for that subscriber. If dequeue rate of a subscriber is higher than or equal to enqueue rate at an instance, that instance is "not loaded" for that subscriber.

A load balancer may perform functions such as:
Load calculation at all instances;
Detection of need of message forwarding from an instance (loaded) to other instance (not loaded) when messages are not getting dequeued by subscriber(s) at all instances where enqueues are in progress;
Choosing a shard from all available shards at loaded instance from which messages are forwarded to instance where load is less;
Shifting dequeue ownership of a chosen shard from loaded instance to an instance with less load;
Starting cross processes to forward messages to less loaded instances;
Stopping cross processes to end forwarding messages to avoid overloading other instances and to reduce inter-instance communication;
Changing shard's ownership—e.g. in case of addition or removal of instances from the shared-disk database, shards owned by dead instances may be made available to alive instances for draining purposes;

These functions are example functions that may be performed by a load balancer; additional functions may be implemented by one or more load balancers in a shared-disk database system.

Load-balancing functionality may be performed locally and globally, such as by a local load balancer and a global load balancer. In one embodiment, load-balancing is implemented in one or more load-balancing layers.

Local Load Balancing

Local load balancing may be performed at each alive instance, and may include tasks such as:
Based on load balancing policy in use, collecting required statistics to calculate "load" at that instance;

Receiving and processing requests from a global load balancer to change dequeue ownership for a particular shard-subscriber pair;

Ensuring that no uncommitted dequeue transaction is present for a shard-subscriber pair while changing dequeue ownership;

Starting a cross process to forward messages to less loaded instances;

Stopping a cross process to end forwarding messages, such as to avoid overloading other instances and to reduce inter-instance communication;

Owning shards whose OWNER_INSTANCE is no longer alive;

These tasks are examples of tasks that may be performed by a local load balancer or a local load balancing process; additional tasks may be implemented by one or more local load balancers in a shared-disk database system.

Global Load Balancing

Global load balancing is performed at only one instance amongst all live instances in a shared-disk database, and may include tasks such as:

Evaluating calculated "load" by local load balancers at all instances;

Deciding if dequeue ownership shift (message forwarding) is required for subscribers;

Sending requests to loaded instances to shift load to less loaded instances;

These tasks are examples of tasks that may be performed by a global load balancer or a global load balancing process; additional tasks may be implemented by one or more local load balancers in a shared-disk database system.

Shared-Disk Database Cross Processes

A cross process refers to a background process in a shared-disk database that sends message data from a shard's enqueue owner instance to one of the queue shard's dequeue owner instances. A cross process forwards messages from one instance to another instance so that the messages may be drained at a different instance. Message transfer results in a shard from enqueue owner instance being replicated at the dequeue owner instance. In one embodiment, cross processes are implemented as a layer adjacent to one or more load-balancing layers. A load balancer or a load-balancing process may trigger a cross process.

In one embodiment, a cross process involves the following components:

Source instance—An instance (enqueue ownership instance) from where messages are being forwarded;

Destination instance—An instance (dequeue ownership instance) where messages are being forwarded to;

Cross master—A background master process which runs at the source instance and forwards messages to the destination instance, and can handle multiple cross processes simultaneously;

Cross server—A background server process which runs at the destination instance and receives messages from the source instance;

Source and shadow shard—The shard which is being forwarded. At the source instance, it is called a source shard. At the destination instance, it is called a shadow shard.

A single cross process unit may be uniquely defined by specifying all of above components.

Messages associated with a shard can be forwarded to multiple instances at the same time to be dequeued by different subscribers. Furthermore, messages associated with the shard be forwarded by different cross masters to different instances at the same time.

A cross master reads messages from the message cache at the source instance and forwards messages to the destination instance through the interconnect of the shared-disk database. A cross server receives these messages and populates them in the message cache at the destination instance. In one embodiment, only one cross master can forward messages associated with a shard from a source instance to a particular destination instance at any point of time. A cross process may be used by any number of subscribers to access messages when the same combination of shard, source instance and destination instance is involved.

Shadow Shard

A shard may be forwarded from a source instance to a destination instance. The term "shadow shard" shard refers to a forwarded shard at the destination instance. A shadow shard is created and populated at a non enqueue owner instance of the source shard for remote subscribers at the non enqueue owner instance to dequeue from. Shadow shards may be created and populated by a cross process by forwarding data over the interconnect of a shared-disk database. On a shared-disk database where forwarding is enabled, the instance with dequeue affinity and enqueue affinity might be different. In such a case, the message data on a first instance with enqueue affinity to a shard is replicated to the message cache of a second instance with dequeue affinity for that shard. The replicate shard is called a shadow shard. Shadow shards do not need queue table partition associations as no enqueue will be done, only dequeues will be performed. Shadow shards are thus only associated with dequeue log partitions.

Figure 8:
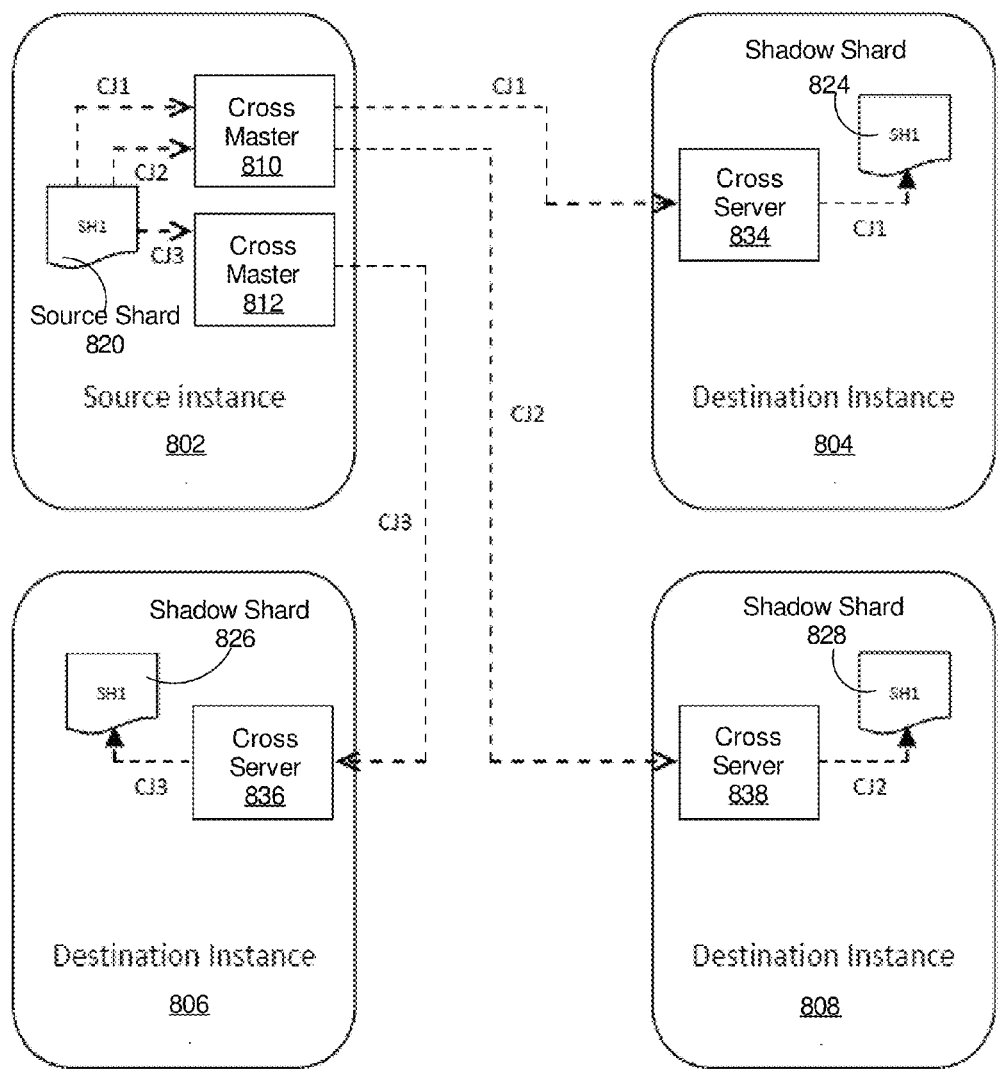
FIG. 8 is a block diagram illustrating cross processes between a source instance and destination instances, according to an embodiment.

FIG. 8 is a block diagram illustrating an embodiment of cross processes with respect to a source instance and destination instances. Cross jobs CJ1, CJ2, CJ3 forward source shard 820 (SH1) from source instance 802 to shadow shards 824-828 of destination instances 804-808 for different subscribers. A cross master 810-812 reads messages from the message cache at the source instance 802 and forwards messages to the destination instance 804-808 through the interconnect. A cross server 834-838 receives these messages and populates them in the message cache at the destination instance 804-808.

For example:

cross job CJ1 forwards SH1 from source instance 802 to destination instance 804 via cross master 810;

cross job CJ2 forwards SH1 from source instance 802 to destination instance 808 via cross master 810; and cross job CJ3 forwards SH1 from source instance 802 to destination instance 806 via cross master 812.

As shown, a cross master, such as cross master 810, can handle multiple cross jobs simultaneously. A shard SH1 can also be forwarded to multiple destination instances 804-808 at the same time to be dequeued by different subscribers. Additionally, a shard can be forwarded by different cross masters 810-812 to different destination instances 804-808 at the same time. In one embodiment, only one cross master can forward a shard from a source instance to a particular destination instance at any specific point of time. A cross job could be used by any number of subscribers to forward messages for the same combination of shard, source instance and destination instance.

Cross Process Control Messages

When messages are dequeued from shadow shards at a destination instance, the ordering of messages enqueued by each enqueue session must be maintained. In one embodiment, cross process control messages containing special control metadata are inserted in the source shard's message cache at the time of transaction activity, like commit or rollback. Control messages contain transactional details of ongoing enqueues in the subshard. The remote instance can determine the state of each message in the subshard using the control messages.

Using cross process control messages, a full replay protocol may be implemented. All transactional activity which happened in the source shard at the source instance is replayed in the shadow shard at the destination instance in exactly same order.

FIGS. 9A-D are block diagrams illustrating full replay protocol, according to an embodiment. For example, in FIG. 9A, messages M1, M3 and M4 are enqueued in source shard 910 at times T0, T2 and T3 respectively and are part of transaction Tx1, where T0<T2<T3. Similarly, messages M2, M5 and M6 are enqueued at time T1, T4 and T6 respectively and part of transaction Tx2 where T1<T4<T6.

At time T4, messages M1 to M5 are not committed and hence not seen by dequeuers. When transaction Tx1 commits at time T5, special control metadata is inserted which signifies transaction Tx1 is committed for messages M1, M3 and M4. At this time, only messages M1, M3 and M4 could be dequeued. Messages M2 and M5 are still not visible to dequeue sessions at time T5.

When transaction Tx2 commits at T7, a special control metadata is inserted which signifies transaction Tx2 is committed for messages M2, M5 and M6. At this time, all messages from M1 to M6 could be dequeued.

When a cross master process forwards source shard 910 to the destination instance, all messages along with the special control metadata are forwarded as is. At first, messages M1 to M5 are sent in order of enqueue time. In shadow shard 920, all messages are allocated as not committed and thus are not visible for dequeue, as marked "UC" in FIG. 9B.

When the special control metadata for Tx1 commit is forwarded to the destination instance, the cross server process at the destination instance makes messages in transaction Tx1 visible for dequeue, as marked by "C" in FIG. 9C.

In one embodiment, special control metadata is not allocated in shadow shards. Finally, when the special control metadata for Tx2 commit is forwarded to the destination instance, the cross server process at destination instance makes messages in transaction Tx2 visible for dequeue as represented in FIG. 9D. As shown in FIGS. 9A-9D, full replay protocol preserves the ordering of messages enqueued by enqueue sessions in shadow shard 920.

Message Cache and Queue Table in Shared-Disk Databases

In one embodiment, a partition subsystem is used to implement a partitioning scheme to avoid write-write contention during enqueue and dequeue operations across instances of a shared-disk database. In one embodiment, the partition subsystem is implemented as a partition layer. The partition subsystem implements this partitioning scheme via two key subcomponents:
Partition Map
Partition Cache The partition map maintains the mapping between a physical partition and a subshard. The partition map contains partition usage information across the shared-disk database system. Since every persistent queuing operation requires partition information, i.e., partition id or partition name, to access the partition, reducing the response time from the partition map is critical to reducing the overall latency of queuing operations. For this purpose, the partition subsystem employs the partition cache, an in-memory caching facility.

The partition cache proactively caches the partition information and thus allows fast reads and writes for persistent messages. The partition cache always guarantees the inclusion property that all partition information used in the message cache is always available in the partition cache.

The message cache expects to receive a partition from the partition subsystem while the partition subsystem proactively provisions partitions in background. For the first enqueue to a subshard, the partition subsystem maps a partition for the given shard id, priority id, and subshard id by updating the mapping of the partition map table and adding an entry into the partition cache. Similarly, for reload from a subshard (after instance restart or removal of an instance), the partition subsystem searches the entry in the partition cache with the given shard id, priority, and subshard id.

Special Considerations for Enqueue Under Memory Pressure in a Shared-Disk Database In a shared-disk database, due to the need to include control messages in the message cache, an uncached subshard may have a corresponding circular buffer even if the message cache is under memory pressure. Unlike a circular buffer associated with a cached subshard, the circular buffer associated with an uncached subshard does not store enqueued messages. Rather, after the enqueued messages are enqueued in the corresponding partition of the queue table, a control message is generated and placed in the circular buffer. If a transaction enqueues only uncached messages, then the database generates a control message with only a commit SCN in case of commit and no control message in case of rollback. If a transaction enqueues both cached and uncached messages, the control message will contain all the message identifiers of the cached messages that were committed or rolled back, followed by the commit SCN or the rollback SCN. Control messages stored in a circular buffer for an uncached subshard are used for message forwarding. For example, a cross process may use control messages stored in the circular buffer of an uncached subshard message to populate a shadow shard. Message forwarding under memory pressure shall be described in greater detail hereafter.

Figure 12:
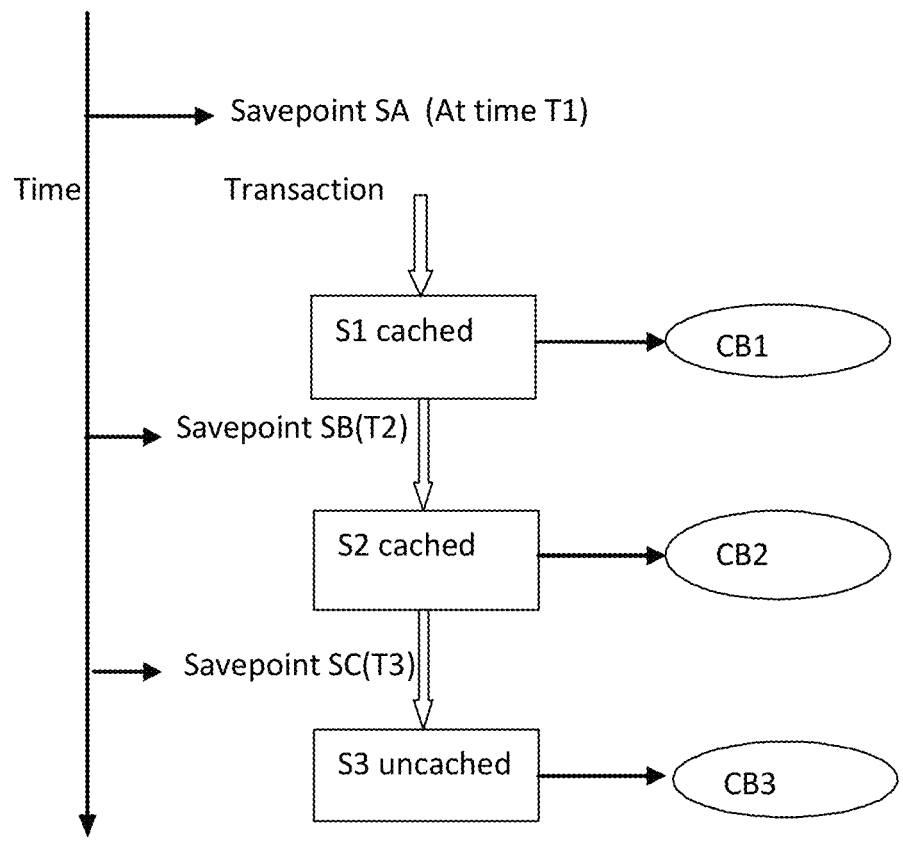
FIG. 12 is a block diagram illustrating a control message allocation, according to an embodiment.

FIG. 12 illustrates the control message allocations. In this example, subshards S1 and S2 are cached, and subshard S3 is uncached. Subshards S1, S2 and S3 have circular buffers CB1, CB2 and CB3, respectively. In case the transaction is rolled back to savepoint SC, no control message is allocated as the messages enqueued after time T3 are uncached. If the enqueue transaction is rolled back to savepoint SB, a control message is allocated which contains the identifiers of all the messages the transaction enqueued in subshard S2. The control message is a rollback message as the control message is sent ahead of the commit or rollback. If the enqueue transaction performs a commit without any roll backs, a control message is allocated which contains the identifiers of messages the transaction enqueued in subshards S1 and S2 followed by the commit SCN.

Figure 13:
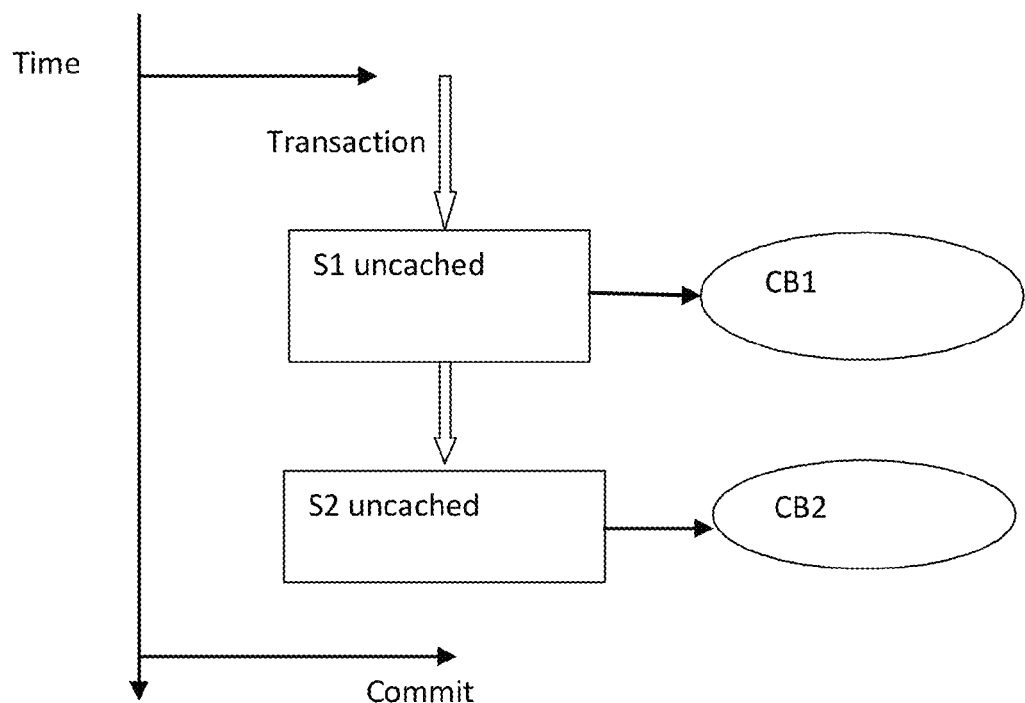
FIG. 13 is a block diagram illustrating a control message allocation, according to an embodiment.

In another example shown in FIG. 13, Subshards S1 and S2 are uncached. If the enqueue transaction performs a commit, a control message is allocated with only the commit SCN of the transaction.

Source and/or Destination Under Memory Pressure

In a shared-disk database, messages may be forwarded from an enqueuing instance to a dequeuing instance, such as over an interconnect of the shared-disk database. There are four possible combinations with respect to memory pressure:
sufficient shared memory available at the enqueuing instance and the dequeuing instance;
sufficient memory available at the enqueuing instance, and memory pressure at the dequeuing instance;
memory pressure at the enqueuing instance, and sufficient memory at the dequeuing instance;
memory pressure at both the enqueuing instance and the dequeuing instance.

When there is sufficient shared memory available at the enqueuing instance and the dequeuing instance, sharded queues operate without special considerations for memory pressure. The handling of each of the other scenarios is described hereafter.

Memory Pressure at Dequeuing Instance

When there is sufficient memory available at the enqueuing instance and memory pressure at the dequeuing instance, messages are enqueued as cached messages in the source shard at the enqueuing instance. However, there is not enough shared memory available at the dequeuing instance for newly created subshards and/or cached subshards at the enqueuing instance that have not been forwarded to the dequeuing instance. Instead of sending messages to the dequeuing instance and inserting these messages to message cache at the dequeuing instance, the dequeuing instance will access these messages using a SQL command.

At the enqueuing instance, which has adequate shared memory, cached subshards are still generated. However, the queue table partition corresponding to these cached subshards are modified to support uncached access by the dequeuing instance. On the enqueuing instance, the indexed column (used for dequeuing from the queue table when a message is not in the message cache, as described above) must be populated so that the sequence number is available in order to access respond to a request for a message by the dequeuing instance.

To avoid write-write contention between the enqueuing instance and the dequeuing instance, the enqueuing instance (rather than the dequeuing instance) populates the indexed column. For the messages that will not be cached at the dequeuing instance, the enqueuing instance also updates all the control messages with the latest SCN so the flashback query used by dequeuers at the dequeuing instance will see the populated indexed column.

The enqueuing instance still sends control messages to the dequeuing instance that is under memory pressure. Each control message contains sufficient information for the dequeuing instance to obtain the enqueued message, such as by using a SQL command. For example, rather than forwarding enqueued messages to the dequeuing instance, the enqueuing instance forwards control messages corresponding to the enqueued messages. Until there is sufficient shared memory at the dequeuing instance, future partitions of the source shard at the enqueuing instance are created to support uncached access of the partition (i.e., by populating the indexed column). When the dequeuing instance has sufficient shared memory, the enqueuing instance can resume its ordinary behavior. In one embodiment, the decision to resume message caching is delayed to avoid thrashing between operation under memory pressure and regular behavior. For example, the decision to resume message caching may be delayed until the current subshard is full.

Memory Pressure at Enqueuing Instance

When there is memory pressure at the enqueuing instance and sufficient memory at the dequeuing instance, the subshard is uncached at the enqueuing instance. Instead of forwarding enqueued messages, control messages corresponding to the enqueued messages are forwarded. These control messages contains sufficient information for the dequeuing instance to obtain an enqueued message, such as by using a SQL command.

Memory Pressure at Both Enqueuing Instance and Dequeuing Instance

When there is memory pressure at the enqueuing instance as well as the dequeuing instance, the subshard is uncached at the enqueuing instance. Instead of forwarding enqueued messages, control messages corresponding to the enqueued messages are forwarded. These control messages contains sufficient information for the dequeuing instance to obtain an enqueued message, such as by using a SQL command.

Cross Process Operation Under Memory Pressure

As described above, in a shared-disk database, cross processes are configured to forwarded messages and/or control messages to a dequeuing instance, or a destination instance, from a source instance of the shared-disk database. A cross process involves a component on the source instance (e.g. the cross master background process) and a component on the destination instance (e.g. the cross server background process) that writes messages to the in-memory message cache at the destination instance.

When the destination instance has enough memory to accommodate messages in a message cache:
For any uncached subshard of a source shard, a cross process transmits control messages from the source instance to the destination instance. The control messages contain sufficient information (e.g. sufficient message metadata to dequeue the message using SQL) to generate the corresponding uncached shadow shard.
For any cached subshard of a source shard, a cross process transmits messages from the source instance to the destination instance. The messages populate an allocated cached subshard in the corresponding shadow shard at the destination instance.

When the destination instance is under memory pressure:
For any uncached subshard of a source shard, a cross process transmits control messages from the source instance to the destination instance. The control messages contain sufficient information (e.g. sufficient message metadata to dequeue the message using SQL) to generate the corresponding uncached shadow shard.

For any cached subshard of a source shard, a cross process transmits control messages from the source instance to the destination instance. The control messages contain sufficient information (e.g. sufficient message metadata to dequeue the message using SQL) to generate the corresponding uncached shadow shard.

When the destination instance is under memory pressure, the forwarding of a cached subshard requires special handling, which shall be described in detail hereafter. This corresponds to the case where the destination instance is under memory pressure, but the source instance was not under memory pressure.

Forwarding a Cached Subshard to a Destination Instance Under Memory Pressure

When the destination instance is under memory pressure, control messages received from the source instance will be placed in an uncached subshard of a shadow shard on the destination instance. Thus, the "current subshard" of the shadow shard will be an uncached subshard, even if the current uncached subshard corresponds to a cached subshard of a source shard at the source instance.

To dequeue a message from the uncached shadow subshard of the destination instance, a dequeue session at the destination instance dequeues the control message, which contains sufficient message metadata for the dequeue session to obtain the message from the corresponding queue table partition of the source instance, such as by using an SQL command.

When the source instance is not under memory pressure, it maintains cached subshards. As explained above, for messages that belong to cached subshards, the indexed sequence number column is not populated in the queue table partition corresponding to the subshard, since messages are typically dequeued from the message cache rather than the queue table partition. For example, as described above, an indexed "sequence number" column may be populated only for uncached subshards to reduce index maintenance overhead.

To facilitate dequeuing from such uncached shadow subshards at the destination instance, the indexed sequence number column is populated in the queue table partition of at the source instance before control messages corresponding to the enqueued messages are forwarded to the destination instance. If the indexed sequence number column is populated for a specific cached source subshard N to facilitate dequeuing at a destination instance under memory pressure, the SCN generated after the population procedure may be higher than the commit SCNs stored with subshards in the shard enqueued after subshard N. To preserve the order of messages enqueued by each enqueue session in this subshard, all the control messages present from subshard N to last subshard of the shard are updated with the latest SCN.

Addition and Removal of Instances

The enqueue ownership table described herein may include additional columns, such as to facilitate the addition and removal instances, such as in an embodiment that shall be described in greater detail hereafter.

In one embodiment, load-balancing architecture is configured such that the addition of an instance to the shared-disk database does not require additional set up.

When an instance is removed from a shared-disk database, shards owned by the removed instance need to be taken over by other live instances. As stated earlier, a dictionary table storing shard ownership information may include the following columns:
QUEUE
SHARD
ENQUEUE_INSTANCE.

Additional columns may be implemented for changing the owner of shards owned by dead/removed instances. The additional columns may include:
PREFERRED_OWNER_INSTANCE (system generated preferred instance number to used during fail over on owner_instance crash)
OWNER_INSTANCE (current owner instance)
FLAGS (state of the shard).

In the embodiment, ENQUEUE_INSTANCE is the instance where shard is created and is the only instance eligible for enqueue for the specified SHARD. OWNER_INSTANCE is the instance which takes load balancing decisions for that shard. At the time of shard creation, ENQUEUE_INSTANCE and OWNER_INSTANCE are same. When OWNER_INSTANCE is not alive, OWNER_INSTANCE may change and differ from ENQUEUE_INSTANCE. However ENQUEUE_INSTANCE is never changed. PREFERRED_OWNER_INSTANCE is the instance which is supposed to take ownership of the shard if OWNER_INSTANCE is not alive. If PREFERRED_OWNER_INSTANCE is not alive, the ownership could be taken by any live instance.

Non-Persistent Messages

In the previous sections, embodiments have been described in which messages in the queue persist on disk until all messages in the queue have been consumed by all subscribers, or until the queue has been removed. However, non-persistent messages are maintained only in the message cache, and not durably stored in any disk table (e.g. the queue table or dequeue-log table).

A shard may be persistent or volatile. A persistent shard is a shard associated with one or more queue table partitions. Messages in the shard are written to a database table by the enqueue driver. A volatile shard is used only for buffered or non-persistent messages which are not persisted to a database table. Volatile shards are not associated with queue table partitions or dequeue log partitions.

Crash Recovery

When a database instance is started after an instance crash or a normal shutdown, for each sharded queue a SQL SELECT command is issued with an ORDER BY clause on each nonempty partition of the queue table. This SQL SELECT statement reads all not-yet-dequeued messages from the queue table into the message cache. A SQL SELECT command is also issued on each non-empty dequeue log partition, to load the information contained therein into cache.

Java Message Service Queues

The sharded queues described herein may be used to implement JMS queues. Sharded queues may be configured to completely support JMS. Point-to-point queues as well as publish-subscribe topics (i.e. multiple subscriber queue) are supported.

Nonpersistent JMS messages are implemented like persistent JMS messages, but do not use the queue table and dequeue log table. Message listeners can be supported by having an existing message listener mechanism iterate over all shards.

Nondurable JMS subscribers are implemented like durable JMS subscribers, but keep their metadata only in volatile memory. Nondurable subscribers do not log dequeue operations in the dequeue log.

In one embodiment, a nondurable subscriber evaluates its rule when deciding whether a message is eligible for dequeue. However, in alternative embodiments, this evaluation could also be done at enqueue time or in the background.

Like durable subscribers, a nondurable subscriber uses an entry in the subscriber bitmap to indicate whether the subscriber is dequeuing or has dequeued a message.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
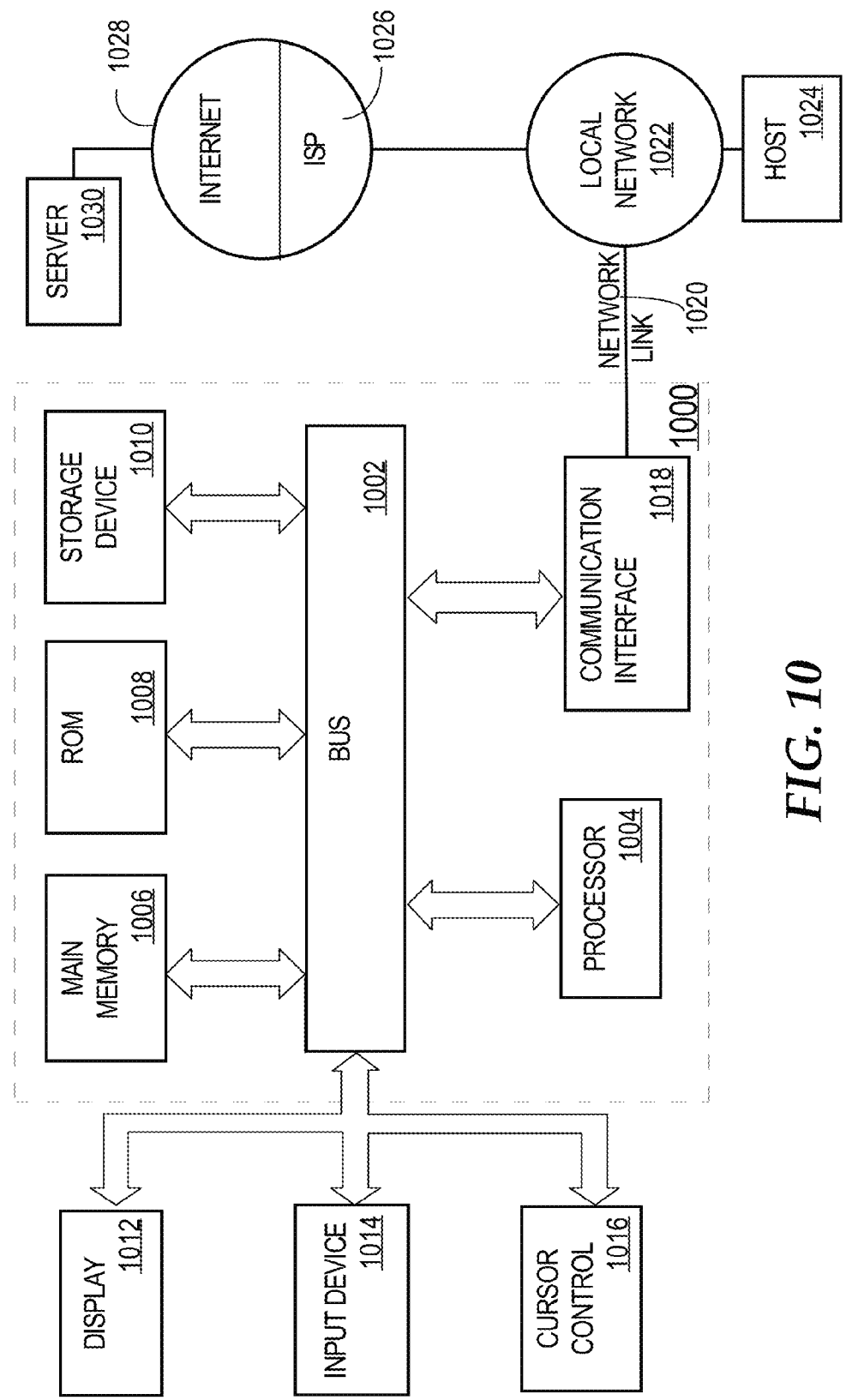
FIG. 10 illustrates a computer system upon which one or more embodiments may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    enqueueing messages from a plurality of enqueuers in a plurality of shards of a sharded queue;
    wherein the plurality of enqueuers comprises a first enqueuer, wherein all messages from the first enqueuer are enqueued in a first shard;
    maintaining, in a relational database system, a queue table corresponding to the sharded queue;
    maintaining, in volatile memory, a plurality of message caches, each message cache corresponding to a shard of the plurality of shards;
    determining whether memory pressure is detected based on memory usage of the volatile memory;
    wherein enqueueing a specific message from the first enqueuer in the first shard comprises:
        responsive to not detecting memory pressure:
            storing the specific message in a row of the queue table that is assigned to the first shard; and
            storing the specific message in a first message cache of the plurality of message caches, the first message cache corresponding to the first shard;
        responsive to detecting memory pressure, storing the specific message in a row of the queue table that is assigned to the first shard without storing the specific message in the first message cache;
    causing subscribers of the sharded queue to dequeue messages from the plurality of shards;
    wherein the method is performed by one or more computing devices.

2. The method of claim 1,
    wherein the first shard of the plurality of shards comprises a plurality of subshards;
    wherein the specific message is stored in a row of the queue table that is assigned to a current subshard of the first shard;
    wherein the first message cache comprises a plurality of circular buffers each corresponding to a subshard of the first shard;
    wherein storing the specific message in the first message cache comprises storing the specific message in a current buffer of the plurality of circular buffers, the current buffer corresponding to the current subshard.

3. A method comprising:
    storing messages from a plurality of enqueuers in a plurality of shards of a sharded queue;
    wherein the plurality of enqueuers comprises a first enqueuer, wherein messages from the first enqueuer are stored in a first shard;
    maintaining, in a relational database system, a queue table corresponding to the sharded queue;
    maintaining, in volatile memory, a plurality of message caches, each message cache corresponding to a shard of the plurality of shards;
    determining whether memory pressure is detected based on memory usage of the volatile memory;
    wherein storing a specific message from the first enqueuer comprises:
        responsive to not detecting memory pressure:
            storing the specific message in a row of the queue table that is assigned to the first shard; and
            storing the specific message in a first message cache of the plurality of message caches, the first message cache corresponding to the first shard;
        responsive to detecting memory pressure, storing the specific message in a row of the queue table that is assigned to the first shard without storing the specific message in the first message cache;
    causing subscribers of the sharded queue to dequeue messages from the plurality of shards;
    wherein the first message cache comprises a fixed-memory portion and a variable-memory portion;
    wherein, when memory pressure is not detected, the specific message is stored in the variable-memory portion of the message cache;
    the method further comprising, when memory pressure is detected, storing message metadata corresponding to the first message in the fixed-memory portion of the first message cache;
wherein the method is performed by one or more computing devices.

4. A method comprising:
enqueueing messages from a plurality of enqueuers in a plurality of shards of a sharded queue in a shared-disk database system;
maintaining, by the shared-disk database system, a queue table corresponding to the sharded queue;
maintaining, in volatile memory at one or more computing devices executing database instances of the shared-disk database system, a plurality of message caches, each message cache corresponding to a shard of the plurality of shards;
wherein the plurality of enqueuers comprises a first enqueuer, wherein all messages from the first enqueuer are enqueued in a first shard of the plurality of shards;
determining whether memory pressure is detected at a first instance of the shared-disk database based on memory usage of volatile memory of a first computing device executing the first instance, wherein a first message cache corresponding to the first shard is maintained in the volatile memory of the first computing device;
based at least in part on whether memory pressure is detected at the first instance, setting the first shard as cached or uncached;
wherein enqueueing a specific message from the first enqueuer in the first shard comprises:
determining whether the first shard is currently cached;
storing the specific message in a row of the queue table that is assigned to the first shard;
responsive to determining that the first shard is currently cached, storing the specific message in the first message cache;
responsive to determining that the first shard is not currently cached, storing message metadata corresponding to the specific message in the first message cache without storing the specific message in the first message cache;
wherein the method is performed by one or more computing devices.

5. The method of claim 4,
wherein the first shard of the plurality of shards comprises a plurality of subshards;
wherein storing the specific message in a row of the queue table that is assigned to the first shard includes storing the specific message in a row of the queue table that is assigned to a current subshard of the plurality of subshards of the first shard;
wherein storing the message in the first message cache includes storing the specific message in a current buffer of the first message cache, the current buffer corresponding to the current subshard;
wherein determining whether the first shard is currently cached comprises determining whether the current subshard is a cached subshard or an uncached subshard.

6. The method of claim 5, wherein setting the first shard as cached or uncached includes:
responsive to detecting memory pressure, if the current subshard is a cached subshard, switching the current subshard to a next subshard, wherein the next subshard is uncached;
wherein subsequent messages enqueued in the first shard are stored in a partition rows of the queue table that are assigned to the next subshard.

7. The method of claim 5, further comprising:
converting a first cached subshard to a first uncached subshard; and
converting a second uncached subshard to a second cached subshard.

8. The method of claim 5, further comprising:
causing subscribers of the sharded queue to dequeue messages from the plurality of shards;
wherein dequeuing a selected message stored in a selected subshard of the first shard comprises:
when the selected subshard is a cached subshard, dequeuing the selected message from a corresponding buffer of the first message cache;
when the selected subshard is an uncached subshard, dequeuing the selected message from the queue table using SQL.

9. The method of claim 5, further comprising:
causing a subscriber at a second instance of the shared-disk database to dequeue messages from the first message cache by generating a shadow shard of the first shard at the second instance by transmitting entries of the first message cache over an interconnect of the shared-disk database;
wherein generating the shadow shard at the second instance comprises populating a second message cache corresponding to the shadow shard at the second instance;
wherein the subscriber at the second instance dequeues from the shadow shard of the first shard;
determining whether memory pressure is detected at the second instance based on memory usage of volatile memory of a computing device executing the second instance;
wherein, for at least one uncached subshard of the first shard, the second message cache is populated with message metadata for at least one message of the at least one uncached subshard;
wherein, for at least one cached subshard of the first shard,
responsive to determining that memory pressure is not detected at the second instance, the second message cache is populated with at least one message from a buffer corresponding to the at least one cached subshard;
responsive to determining that memory pressure is detected at the second instance, the second message cache is populated with message metadata for at least one message from the buffer corresponding to the at least one cached subshard.

10. The method of claim 4, further comprising:
causing a subscriber at a second instance of the shared-disk database to dequeue messages from the first message cache by generating a shadow shard of the first shard at the second instance by transmitting entries of the first message cache over an interconnect of the shared-disk database;
wherein generating the shadow shard at the second instance comprises populating a second message cache corresponding to the shadow shard at the second instance;
wherein the subscriber at the second instance dequeues from the shadow shard of the first shard.

11. A One or more non-transitory computer-readable media storing instructions which, when executed by one or more processors, cause the one or more processors to carry out:
enqueueing messages from a plurality of enqueuers in a plurality of shards of a sharded queue;
wherein the plurality of enqueuers comprises a first enqueuer, wherein all messages from the first enqueuer are enqueued in a first shard;

maintaining, in a relational database system, a queue table corresponding to the sharded queue;
maintaining, in volatile memory, a plurality of message caches, each message cache corresponding to a shard of the plurality of shards;
determining whether memory pressure is detected based on memory usage of the volatile memory;
wherein enqueueing a specific message from the first enqueuer in the first shard comprises:
  responsive to not detecting memory pressure:
    storing the specific message in a row of the queue table that is assigned to the first shard; and
    storing the specific message in a first message cache of the plurality of message caches, the first message cache corresponding to the first shard;
  responsive to detecting memory pressure, storing the specific message in a row of the queue table that is assigned to the first shard without storing the specific message in the first message cache;
causing subscribers of the sharded queue to dequeue messages from the plurality of shards.

12. The one or more non-transitory computer-readable media of claim 11,
wherein the first shard of the plurality of shards comprises a plurality of subshards;
wherein the specific message is stored in a row of the queue table that is assigned to a current subshard of the first shard;
wherein the first message cache comprises a plurality of circular buffers each corresponding to a subshard of the first shard;
wherein storing the specific message in the first message cache comprises storing the specific message in a current buffer of the plurality of circular buffers, the current buffer corresponding to the current subshard.

13. One or more non-transitory computer-readable media storing instructions which, when executed by one or more processors, cause the one or more processors to carry out:
storing messages from a plurality of enqueuers in a plurality of shards of a sharded queue;
wherein the plurality of enqueuers comprises a first enqueuer, wherein messages from the first enqueuer are stored in a first shard;
maintaining, in a relational database system, a queue table corresponding to the sharded queue;
maintaining, in volatile memory, a plurality of message caches, each message cache corresponding to a shard of the plurality of shards;
determining whether memory pressure is detected based on memory usage of the volatile memory;
wherein storing a specific message from the first enqueuer comprises:
  responsive to not detecting memory pressure:
    storing the specific message in a row of the queue table that is assigned to the first shard; and
    storing the specific message in a first message cache of the plurality of message caches, the first message cache corresponding to the first shard;
  responsive to detecting memory pressure, storing the specific message in a row of the queue table that is assigned to the first shard without storing the specific message in the first message cache;
causing subscribers of the sharded queue to dequeue messages from the plurality of shards;
wherein the first message cache comprises a fixed-memory portion and a variable-memory portion;
wherein, when memory pressure is not detected, the specific message is stored in the variable-memory portion of the message cache;
wherein the instructions which, when executed by one or more processors, cause the one or more processors to carry out: when memory pressure is detected, storing message metadata corresponding to the first message in the fixed-memory portion of the first message cache.

14. One or more non-transitory computer-readable media storing instructions which, when executed by one or more processors, cause the one or more processors to carry out:
enqueueing messages from a plurality of enqueuers in a plurality of shards of a sharded queue in a shared-disk database system;
maintaining, by the shared-disk database system, a queue table corresponding to the sharded queue;
maintaining, in volatile memory of database instances at one or more computing devices executing the shared-disk database system, a plurality of message caches, each message cache corresponding to a shard of the plurality of shards;
wherein the plurality of enqueuers comprises a first enqueuer, wherein all messages from the at least one first enqueuer are enqueued a first shard of the plurality of shards;
determining whether memory pressure is detected at a first instance of the shared-disk database based on memory usage of volatile memory of a first computing device executing the first instance, wherein a first message cache corresponding to the first shard is maintained in the volatile memory of the first computing device;
based at least in part on whether memory pressure is detected at the first instance, setting the first shard as cached or uncached;
wherein enqueueing a specific message from the first enqueuer in the first shard comprises:
  determining whether the first shard is currently cached;
  storing the specific message in a row of the queue table that is assigned to the first shard;
  responsive to determining that the first shard is currently cached, storing the specific message in the first message cache;
  responsive to determining that the first shard is not currently cached, storing message metadata corresponding to the specific message in the first message cache without storing the specific message in the first message cache.

15. The one or more non-transitory computer-readable media of claim 14,
wherein the first shard of the plurality of shards comprises a plurality of subshards;
wherein storing the specific message in a row of the queue table that is assigned to the first shard includes storing the specific message in a row of the queue table that is assigned to a current subshard of the plurality of subshards of the first shard;
wherein storing the message in the first message cache includes storing the specific message is stored in a current buffer of the first message cache, the current buffer corresponding to the current subshard;
wherein determining whether the first shard is currently cached comprises determining whether the current subshard is a cached subshard or an uncached subshard.

16. The one or more non-transitory computer-readable media of claim 15, wherein the instructions which, when executed by one or more processors, cause the one or more processors to carry out:
- responsive to detecting memory pressure, if the current subshard is a cached subshard, switching the current subshard to a next subshard, wherein the next subshard is uncached;
- wherein subsequent messages enqueued in the first shard are stored in rows of the queue table that are assigned to the next subshard.

17. The one or more non-transitory computer-readable media of claim 15, wherein the instructions which, when executed by one or more processors, cause the one or more processors to carry out:
- converting a first cached subshard to a first uncached subshard; and
- converting a second uncached subshard to a second cached subshard.

18. The one or more non-transitory computer-readable media of claim 15, wherein the instructions which, when executed by one or more processors, cause the one or more processors to carry out:
- causing subscribers of the sharded queue to dequeue messages from the plurality of shards;
- wherein dequeuing a selected message stored in a selected subshard of the first shard comprises:
  - when the selected subshard is a cached subshard, dequeuing the selected message from the first message cache;
  - when the selected subshard is an uncached subshard, dequeuing the selected message from the queue table using SQL.

19. The one or more non-transitory computer-readable medium media of claim 15, wherein the instructions which, when executed by one or more processors, cause the one or more processors to carry out:
- causing a subscriber at a second instance of the shared-disk database to dequeue messages from the first message cache by generating a shadow shard of the first shard at the second instance by transmitting entries of the first message cache over an interconnect of the shared-disk database;
- wherein generating the shadow shard at the second instance comprises populating a second message cache corresponding to the shadow shard at the second instance;
- wherein the subscriber at the second instance dequeues from the shadow shard of the first shard;
- determining whether memory pressure is detected at the second instance based on memory usage of volatile memory of a computing device executing the second instance;
- wherein, for at least one uncached subshard of the first shard, the second message cache is populated with message metadata for at least one message of the at least one uncached subshard;
- wherein, for at least one cached subshard of the first shard,
  - responsive to determining that memory pressure is not detected at the second instance, the second message cache is populated with at least one message from a buffer corresponding to the at least one cached subshard;
  - responsive to determining that memory pressure is detected at the second instance, the second message cache is populated with message metadata for at least one message from the buffer corresponding to the at least one cached subshard.

20. The one or more non-transitory computer-readable media of claim 14, wherein the instructions which, when executed by one or more processors, cause the one or more processors to carry out:
- causing a subscriber at a second instance of the shared-disk database to dequeue messages from the first message cache by generating a shadow shard of the first shard at the second instance by transmitting entries of the first message cache over an interconnect of the shared-disk database;
- wherein generating the shadow shard at the second instance comprises populating a second message cache corresponding to the shadow shard at the second instance;
- wherein the subscriber at the second instance dequeues from the shadow shard of the first shard.

* * * * *